US010731885B2

(12) United States Patent
Ajax et al.

(10) Patent No.: US 10,731,885 B2
(45) Date of Patent: Aug. 4, 2020

(54) THERMOSTAT WITH OCCUPANCY DETECTION VIA PROXY MEASUREMENTS OF A PROXY SENSOR

(71) Applicant: Johnson Controls Technology Company, Auburn Hills, MI (US)

(72) Inventors: Michael J. Ajax, Milwaukee, WI (US); Nicholas S. Van Derven, Wauwatosa, WI (US); Joseph R. Ribbich, Waukesha, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 15/953,012

(22) Filed: Apr. 13, 2018

(65) Prior Publication Data

US 2018/0299158 A1  Oct. 18, 2018

Related U.S. Application Data

(60) Provisional application No. 62/485,788, filed on Apr. 14, 2017.

(51) Int. Cl.
*F24F 11/46* (2018.01)
*F24F 11/56* (2018.01)
(Continued)

(52) U.S. Cl.
CPC .............. *F24F 11/46* (2018.01); *F24F 11/56* (2018.01); *F24F 2110/65* (2018.01);
(Continued)

(58) Field of Classification Search
None
See application file for complete search history.

(56) References Cited

U.S. PATENT DOCUMENTS 5,082,173 A  1/1992  Poehlman et al.
5,232,152 A  8/1993  Tsang
(Continued)

FOREIGN PATENT DOCUMENTS

WO  WO-2006/099337 A2  9/2006
WO  WO 2017/031688     3/2012
WO  WO 2012/047938     4/2012

*Primary Examiner* — Mohammad Ali
*Assistant Examiner* — Kelvin Booker
(74) *Attorney, Agent, or Firm* — Foley & Lardner LLP

(57) ABSTRACT

A controller for controlling an environmental condition of a building space includes a proxy sensor configured to measure a proxy value indicating whether an occupant is within the building space and an occupancy sensor configured to measure an occupancy value. The controller includes a processing circuit configured to determine whether the occupant is within the building space based on the occupancy value of the occupancy sensor, generate a proxy parameter based on a first proxy value measured via the proxy sensor in response to a determination that the occupant is not within the building space based on the occupancy value of the occupancy sensor, determine whether the occupant is within the building based on a second proxy value measured via the proxy sensor and the generated proxy parameter, and control one or more pieces of building equipment to control the environmental condition of the building space.

18 Claims, 10 Drawing Sheets

(51) Int. Cl.
*G05B 15/02* (2006.01)
*G05B 19/04* (2006.01)
*F24F 120/12* (2018.01)
*F24F 110/70* (2018.01)
*F24F 110/76* (2018.01)
*F24F 110/66* (2018.01)
*G05B 19/048* (2006.01)
*G05B 19/042* (2006.01)
*F24F 110/65* (2018.01)
*F24F 120/00* (2018.01)

(52) U.S. Cl.
CPC ....... *F24F 2110/66* (2018.01); *F24F 2110/70* (2018.01); *F24F 2110/76* (2018.01); *F24F 2120/00* (2018.01); *F24F 2120/12* (2018.01); *G05B 15/02* (2013.01); *G05B 19/042* (2013.01); *G05B 19/048* (2013.01)

(56) References Cited

U.S. PATENT DOCUMENTS

| | | |
|---|---|---|
| 5,364,026 A | 11/1994 | Kundert |
| 5,433,377 A | 7/1995 | Sodo et al. |
| 5,482,210 A | 1/1996 | Carey et al. |
| 5,547,107 A | 8/1996 | Boiardi |
| 5,902,183 A | 5/1999 | D'Souza |
| 6,119,680 A | 9/2000 | Barritt |
| 6,161,764 A | 12/2000 | Jatnieks |
| 6,318,639 B1 | 11/2001 | Toth |
| 6,398,118 B1 | 6/2002 | Rosen et al. |
| 6,431,268 B1 | 8/2002 | Rudd |
| 6,467,695 B1 | 10/2002 | Riley et al. |
| 6,514,138 B2 | 2/2003 | Estepp |
| 6,920,874 B1 | 7/2005 | Siegel |
| 6,935,570 B2 | 8/2005 | Acker, Jr. |
| 6,941,193 B2 | 9/2005 | Frecska et al. |
| 6,988,671 B2 | 1/2006 | Deluca |
| 7,044,397 B2 | 5/2006 | Bartlett et al. |
| 7,113,086 B2 | 9/2006 | Shorrock |
| 7,222,494 B2 | 5/2007 | Peterson et al. |
| 7,226,496 B2 | 6/2007 | Ehlers |
| 7,325,748 B2 | 2/2008 | Acker, Jr. |
| 7,434,413 B2 | 10/2008 | Wruck |
| 7,758,408 B2 | 7/2010 | Hagentoft |
| 7,788,936 B2 | 9/2010 | Peterson et al. |
| 7,793,510 B2 | 9/2010 | Perry et al. |
| 7,798,418 B1 | 9/2010 | Rudd |
| 8,091,796 B2 | 1/2012 | Amundson et al. |
| 8,100,746 B2 | 1/2012 | Heidel et al. |
| 8,141,373 B2 | 3/2012 | Peterson et al. |
| 8,165,721 B2 | 4/2012 | Petit |
| 8,185,244 B2 | 5/2012 | Wolfson |
| 8,190,367 B2 | 5/2012 | Bassa |
| 8,214,085 B2 | 7/2012 | Boudreau et al. |
| 8,219,249 B2 | 7/2012 | Harrod et al. |
| 8,463,344 B2 | 6/2013 | Williams |
| 8,511,578 B2 | 8/2013 | Has |
| 8,543,244 B2 | 9/2013 | Keeling et al. |
| 8,555,662 B2 | 10/2013 | Peterson et al. |
| 8,640,970 B2 | 2/2014 | Dorendorf |
| 8,694,164 B2 | 4/2014 | Grohman et al. |
| 8,694,292 B2 * | 4/2014 | Peterman ............ G06F 17/5004 703/2 |
| 8,768,521 B2 | 7/2014 | Amundson et al. |
| 8,874,497 B2 | 10/2014 | Raestik et al. |
| 8,924,026 B2 | 12/2014 | Federspiel et al. |
| 8,939,827 B2 | 1/2015 | Boudreau et al. |
| 9,056,539 B2 | 6/2015 | Mirza et al. |
| 9,291,358 B2 | 3/2016 | Federspiel et al. |
| 9,471,069 B2 | 10/2016 | Amundson et al. |
| 9,494,337 B2 | 11/2016 | Ragg |
| 9,506,665 B2 | 11/2016 | Dorendorf et al. |
| 9,506,668 B2 | 11/2016 | Sinur et al. |
| 9,594,384 B2 | 3/2017 | Bergman et al. |
| 9,618,224 B2 | 4/2017 | Emmons et al. |
| 9,671,125 B2 | 6/2017 | Mowris et al. |
| 9,677,772 B2 | 6/2017 | Siegel et al. |
| 9,696,052 B2 | 7/2017 | Malchiondo et al. |
| 9,810,441 B2 | 11/2017 | Dean-Hendricks et al. |
| 10,571,876 B2 * | 2/2020 | Buda .................... G05B 15/02 |
| 2005/0224069 A1 | 10/2005 | Patil et al. |
| 2006/0004492 A1 | 1/2006 | Terlson et al. |
| 2006/0213000 A1 | 9/2006 | Kimble et al. |
| 2007/0062513 A1 | 3/2007 | Gagas |
| 2007/0264927 A1 | 11/2007 | Choi et al. |
| 2008/0011863 A1 | 1/2008 | Roux et al. |
| 2008/0102744 A1 | 5/2008 | Moore et al. |
| 2008/0291036 A1 * | 11/2008 | Richmond ............ G08B 17/10 340/628 |
| 2009/0001179 A1 | 1/2009 | Dempsey |
| 2010/0107076 A1 | 4/2010 | Grohman et al. |
| 2011/0007017 A1 | 1/2011 | Wallaert |
| 2011/0010652 A1 | 1/2011 | Wallaert |
| 2011/0010653 A1 | 1/2011 | Wallaert et al. |
| 2011/0077758 A1 * | 3/2011 | Tran ...................... G16H 40/67 700/94 |
| 2011/0223850 A1 | 9/2011 | Narayanamurthy et al. |
| 2012/0023428 A1 | 1/2012 | Kennard et al. |
| 2012/0066168 A1 * | 3/2012 | Fadell ................... G05B 15/02 706/52 |
| 2012/0158618 A1 * | 6/2012 | Roskos .................. G06N 5/02 706/12 |
| 2012/0190294 A1 | 7/2012 | Heidel et al. |
| 2012/0245740 A1 | 9/2012 | Raestik et al. |
| 2012/0252345 A1 | 10/2012 | Wolfson |
| 2013/0040550 A1 | 2/2013 | Pfister et al. |
| 2013/0103207 A1 * | 4/2013 | Ruff .................. G05D 23/1902 700/278 |
| 2013/0226352 A1 | 8/2013 | Dean-Hendricks et al. |
| 2014/0085092 A1 * | 3/2014 | Fadell ................. H04L 12/6418 340/628 |
| 2014/0085093 A1 * | 3/2014 | Mittleman ............ H04L 12/282 340/628 |
| 2014/0099872 A1 | 4/2014 | Matsumoto et al. |
| 2014/0130574 A1 | 5/2014 | Happ et al. |
| 2014/0188287 A1 | 7/2014 | Sabata |
| 2014/0202449 A1 | 7/2014 | Snyder |
| 2014/0207282 A1 * | 7/2014 | Angle .................. H04L 12/282 700/257 |
| 2014/0266669 A1 * | 9/2014 | Fadell .................. G05B 19/042 340/501 |
| 2014/0277795 A1 * | 9/2014 | Matsuoka ........... G06Q 30/0202 700/291 |
| 2015/0070181 A1 * | 3/2015 | Fadell .................... G08B 21/22 340/628 |
| 2015/0120015 A1 * | 4/2015 | Fadell .................. G08B 19/005 700/90 |
| 2015/0148963 A1 | 5/2015 | Klein et al. |
| 2015/0156030 A1 * | 6/2015 | Fadell .................. H04L 12/2816 700/90 |
| 2015/0156031 A1 * | 6/2015 | Fadell .................. H04L 12/2816 700/276 |
| 2015/0170503 A1 * | 6/2015 | Wedig .................... G08B 7/066 340/691.5 |
| 2015/0345819 A1 | 12/2015 | Ostrovsky et al. |
| 2015/0369503 A1 | 12/2015 | Flaherty et al. |
| 2015/0369507 A1 | 12/2015 | Flaherty et al. |
| 2015/0369618 A1 * | 12/2015 | Barnard ............. H05B 37/0272 701/491 |
| 2016/0012340 A1 * | 1/2016 | Georgescu ............ G05B 15/02 700/276 |
| 2016/0040902 A1 | 2/2016 | Shah |
| 2016/0069580 A1 | 3/2016 | Crisa |
| 2016/0071386 A1 * | 3/2016 | Mittleman ............ G08B 17/113 340/628 |
| 2016/0116177 A1 | 4/2016 | Sikora et al. |
| 2016/0127875 A1 * | 5/2016 | Zampini, II ........... H04W 4/043 370/311 |
| 2016/0153674 A1 * | 6/2016 | Lancaster .............. H04Q 9/00 700/276 |

(56) References Cited

U.S. PATENT DOCUMENTS

| | | | |
|---|---|---|---|
| 2016/0195856 A1* | 7/2016 | Spero | G06N 5/046 |
| | | | 700/90 |
| 2016/0223215 A1* | 8/2016 | Buda | G05B 15/02 |
| 2016/0223503 A1 | 8/2016 | Abejassera et al. | |
| 2016/0231014 A1 | 8/2016 | Ro et al. | |
| 2016/0377298 A1 | 12/2016 | Livchak et al. | |
| 2017/0017214 A1* | 1/2017 | O'Keeffe | G05B 15/02 |
| 2017/0038787 A1* | 2/2017 | Baker | H05B 37/0272 |
| 2017/0052545 A1 | 2/2017 | Cortez | |
| 2017/0053068 A1* | 2/2017 | Pillai | G06Q 50/10 |
| 2017/0067239 A1 | 3/2017 | Dorendorf et al. | |
| 2017/0124838 A1* | 5/2017 | Sinha | G05B 19/048 |
| 2017/0130981 A1 | 5/2017 | Willette et al. | |
| 2017/0136206 A1 | 5/2017 | Pillai et al. | |
| 2017/0139386 A1 | 5/2017 | Pillai et al. | |
| 2017/0159954 A1 | 6/2017 | Bergman et al. | |
| 2017/0176030 A1 | 6/2017 | Emmons et al. | |
| 2017/0231058 A1* | 8/2017 | Sadwick | H05B 33/0857 |
| 2018/0167547 A1* | 6/2018 | Casey | G06K 9/2027 |
| 2018/0299153 A1* | 10/2018 | Ajax | G05B 15/02 |
| 2019/0209806 A1* | 7/2019 | Allen | A61M 21/0094 |

* cited by examiner

THERMOSTAT WITH OCCUPANCY DETECTION VIA PROXY MEASUREMENTS OF A PROXY SENSOR

CROSS-REFERENCE TO RELATED PATENT APPLICATIONS

This application claims the benefit of and priority to U.S. Provisional Patent Application No. 62/485,788 filed Apr. 14, 2017, the entire disclosure of which is incorporated by reference herein.

BACKGROUND

The present disclosure relates generally to thermostats and more particularly to an improved control of heating, ventilating, and air conditioning (HVAC) systems of a building space through the use of a multi-function, multi-touch, thermostat.

A thermostat is, in general, a component of an HVAC control system. Traditional thermostats sense the temperature of a system and control components of the HVAC system in order to maintain a setpoint. A thermostat may be designed to control a heating or cooling system or an air conditioner (or a heat pump). Thermostats are manufactured in many ways, and use a variety of sensors to measure temperature and other desired parameters of a system.

Conventional thermostats are configured for one-way communication to connected components, and to control HVAC systems by turning on or off certain components or by regulating flow. Each thermostat may include a temperature sensor and a user interface. The user interface typically includes display for presenting information to a user and one or more user interface elements for receiving input from a user. To control the temperature of a building or space, a user adjusts the setpoint via the thermostat's user interface.

SUMMARY OF THE INVENTION

One implementation of the present disclosure is a controller for controlling an environmental condition of a building space. The controller includes a proxy sensor configured to measure a proxy value indicating whether an occupant is within the building space and an occupancy sensor configured to measure an occupancy value indicating whether the occupant is within the building space. The controller includes a processing circuit configured to determine whether the occupant is within the building space based on the occupancy value of the occupancy sensor, generate a proxy parameter based on a first proxy value measured via the proxy sensor in response to a determination that the occupant is not within the building space based on the occupancy value of the occupancy sensor, determine whether the occupant is within the building based on a second proxy value measured via the proxy sensor and the generated proxy parameter, and control one or more pieces of building equipment to control the environmental condition of the building space based on whether the occupant is within the building space.

In some embodiments, the proxy sensor is a vibration sensor configured to measure vibration signals of the building space. In some embodiments, the processing circuit is configured to determine whether the occupant is within the building space based on the vibration signals.

In some embodiments, the proxy sensor is a light sensor configured to measure a light level of the building space. In some embodiments, the processing circuit is configured to determine whether the occupant is within the building space based on the light level of the building space.

In some embodiments, the occupancy sensor or the proxy sensor is at least one of a camera configured to capture an image of the building space, a light sensor configured to measure light in the building space, a microphone configured to measure sound within the building space, and a vibration sensor configured to measure vibrations within the building space.

In some embodiments, the occupancy sensor is a camera configured to capture one or more images of the building space, where the processing circuit is configured to determine whether the occupant is within the building space by searching the one or more captured images for an indication of the occupant within the one or more captured images.

In some embodiments, the proxy sensor is a microphone configured to measure audio signals of the building space. In some embodiments, the processing circuit is configured to determine whether the occupant is within the building space by determining one or more characteristics of the audio signals and determining, based on the determined one of more characteristic, whether the occupant is within the building space.

In some embodiments, the occupancy sensor device is at least one of a proximity sensor and a passive infrared (PIR) sensor configured to determine an indication of whether the occupant is within the building space, where the processing circuit is configured to determine whether the occupant is within the building space based on the indication of whether the occupant is within the building space determined by the at least one of the proximity sensor and the PIR sensor.

In some embodiments, the processing circuit is configured to determine whether the occupant is within the building based on the second proxy value measured via the proxy senor and the generated proxy parameter by determining that the occupant is within the building space in response to at least one of determining that the occupant is within the building space based on the second proxy value and the generated proxy parameter and determining that the occupant is not within the building space based on the occupancy value of the occupancy parameter. In some embodiments, determining that the occupant is not within the building space in response to determining that the occupant is within the building based on the second proxy value and the generated proxy parameter and determining that the occupant is within the building space based on the occupancy value of the occupancy sensor.

In some embodiments, the proxy sensor is a gas sensor configured to measure a concentration level of an occupant generated gas in the building space, the occupant generated gas generated by the occupant.

In some embodiments, the concentration level of the occupant generated gas is at least one of a carbon dioxide ($CO_2$) concentration level, a volatile organic compound (VOC) concentration level, and a nitrogen dioxide ($NO_2$) concentration level.

In some embodiments, the occupant generated gas is at least one of a volatile organic compound (VOC) concentration level and a nitrogen dioxide ($NO_2$) concentration level.

In some embodiments, the proxy parameter is a baseline value. In some embodiments, the processing circuit is configured to determine whether the occupant is within the building space based on the second proxy value measured via the proxy sensor and the generated proxy parameter by comparing the concentration level of the occupant generated gas to the baseline value.

In some embodiments, the proxy parameter is a parameter of a model. In some embodiments, the processing circuit is configured to generate the model parameter based on the first proxy value measured via the proxy sensor in response to the determination that the occupant is not within the building space based on the occupancy value of the occupancy sensor by training the model with the first proxy value and determine whether the occupant is within the building space based on the second proxy value, the model parameter, and the model.

In some embodiments, the proxy parameter is a baseline value. In some embodiments, the processing circuit is configured to receive a plurality of concentration levels of the occupant generated gas via the gas sensor, each of the plurality of concentration levels associated with a particular time of a plurality of times and update the baseline value based on the plurality of concentration levels by performing a rolling average on the plurality of concentration levels.

In some embodiments, the processing circuit is configured to receive a plurality of occupancy values via the occupancy sensor, each of the plurality of occupancy values indicating whether the occupant is within the building space, determine that the occupant is not within the building space based on the plurality of occupancy values, associate the plurality of concentration levels with times of no occupancy in the building space responsive to the determination that the occupant is not within the building space based on the plurality of occupancy values of the occupancy sensor, and update the generated proxy parameter based on the plurality of concentration levels of the proxy sensor in response to the association.

Another implementation of the present disclosure is a method for controlling an environmental condition of a building space. The method includes determining, by a processing circuit, whether an occupant is within the building space based on an occupancy value of an occupancy sensor, wherein the occupancy sensor is configured to measure an occupancy value indicating whether an occupant is within the building space, generating, by the processing circuit, a proxy parameter based on a first proxy value measured via a proxy sensor in response to a determination that the occupant is not within the building space based on the occupancy value of the occupancy sensor, wherein the proxy sensor is configured to measure a proxy value indicating whether the occupant is within the building space, determining, by the processing circuit, whether the occupant is within the building space based on a second proxy value measured via the proxy sensor and the generated proxy parameter, and controlling, by the processing circuit, one or more pieces of building equipment to control the environmental condition of the building space based on whether the occupant is within the building space.

In some embodiments, the proxy sensor is a gas sensor configured to measure a concentration level of an occupant generated gas in the building space, the occupant generated gas generated by the occupant.

In some embodiments, the concentration level of the occupant generated gas is at least one of a carbon dioxide ($CO_2$) concentration level, a volatile organic compound (VOC) concentration level, and a nitrogen dioxide ($NO_2$) concentration level.

In some embodiments, the proxy parameter is a baseline value. In some embodiments, determining whether the occupant is within the building space based on the second proxy value measured via the proxy sensor and the proxy parameter includes comparing the concentration level of the occupant generated gas to the baseline value.

In some embodiments, the proxy parameter is a parameter of a model. In some embodiments, the method includes generating the model parameter based on the first proxy value measured via the proxy sensor in response to the determination that the occupant is not within the building space by training the model with the first proxy value and determining whether the occupant is within the building space based on the second proxy value measured via the proxy sensor, the model parameter, and the model.

Another implementation of the present disclosure is a system for controlling an environmental condition of a building space. The system includes a proxy sensor configured to measure a proxy value indicating whether an occupant is within the building space, where the proxy sensor is a gas sensor configured to measure a concentration level of an occupant generated gas in the building space, the occupant generated gas generated by an occupant, wherein the concentration level of the occupant generated gas is at least one of a volatile organic compound (VOC) concentration level, an oxygen (O) concentration level, and a nitrogen dioxide ($NO_2$) concentration level. The system includes an occupancy sensor configured to measure an occupancy value indicating whether the occupant is within the building space and a processing circuit. The processing circuit is configured to determine whether the occupant is within the building space based on the occupancy value of the occupancy sensor, generate a proxy parameter based on a first proxy value measured via the proxy sensor in response to a determination that the occupant is not within the building space based on the occupancy value of the occupancy sensor, determine whether the occupant is within the building based on a second proxy value measured via the proxy sensor and the generated proxy parameter, and control one or more pieces of building equipment to control the environmental condition of the building space based on whether the occupant is within the building space.

In some embodiments, the processing circuit is configured to determine whether the occupant is within the building based on the second proxy value measured via the proxy senor and the generated proxy parameter by determining that the occupant is within the building space in response to at least one of determining that the occupant is within the building space based on the second proxy value and the generated proxy parameter and determining that the occupant is not within the building space based on the occupancy value of the occupancy sensor. In some embodiments, determining that the occupant is not within the building space in response to determining that the occupant is within the building based on the second proxy value measured via the proxy sensor and the generated proxy parameter and determining that the occupant is within the building space based on the occupancy value of the occupancy sensor.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the figures, a thermostat including occupancy detection logic is shown, according to various example embodiments. The thermostat described herein may be used in any HVAC system, room, environment, or system within which it is desired to control and/or observe environmental conditions (e.g., temperature, humidity, etc.).

The thermostat described herein is intended to improve the methodologies through which traditional thermostats determine if there is at least one occupant in the environment that the thermostat is designed to control. Traditional thermostats may include a passive infrared system to determine whether any occupants are present. There are limitations to such an approach. For example, if a building space containing multiple rooms only includes a single thermostat and an occupant is in a room other than the one of the thermostat, the traditional system may provide a false indication of zero occupancy.

The thermostat disclosed herein is intended to solve such shortcomings by utilizing at least one proxy to determine if there are any occupants in a building space. For example, the thermostat disclosed herein may detect the concentration level of a human-generated gas (e.g., carbon dioxide) using a high-resolution sensor. Given the resolution of the sensor, even a single occupant in the building space may change the concentration level of the human-generated gas from a baseline by a detectable amount. Accordingly, the thermostat may compare the detected concentration with the baseline. The baseline may be consistently updated based on recent measurements by the detector. Thus, if the detected concentration level is above the updated baseline by more than a predetermined amount, an occupant may be present in the building. Since such human-generated gases diffuse through the air, the thermostat disclosed herein will still detect an occupant even if the occupant is not in the same room as the thermostat. Thus, the systems and methods disclosed herein provide for more accurate occupancy determinations. As such, a building HVAC system may be more efficiently controlled.

Building With HVAC System and Thermostat

Figure 1:
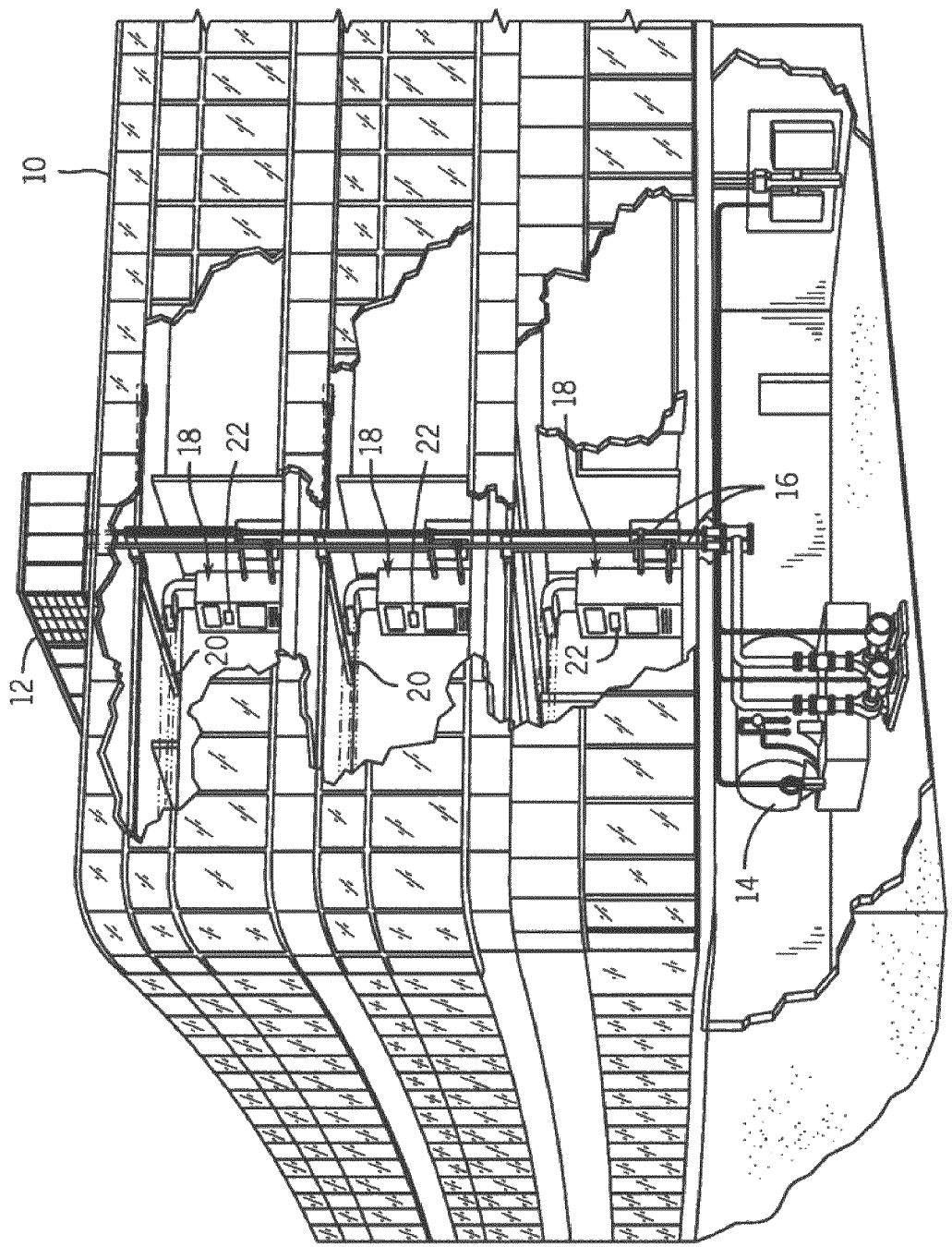
FIG. 1 is an illustration of a commercial or industrial HVAC system that employs heat exchangers, according to an example embodiment.

FIGS. 1 and 3-5 illustrate an example environment in which the current invention may be used. Referring specifically to FIG. 1, a HVAC system for building environmental management is shown, according to an example embodiment. The HVAC system may be a communicating system employing one or more control devices (e.g., thermostats) functioning as system controllers. A building 10 is cooled by a system that includes a chiller 12 and a boiler 14. As shown, chiller 12 is disposed on the roof of building 10 and boiler 14 is located in the basement; however, the chiller and boiler may be located in other equipment spaces or areas next to the building. Chiller 12 is an air cooled or water cooled device that implements a refrigeration cycle to cool water. Chiller 12 may be a stand-alone unit or may be part of a single package unit containing other equipment, such as a blower and/or integrated air handler. Boiler 14 is a closed vessel that includes a furnace to heat water. The water from chiller 12 and boiler 14 is circulated through building 10 by water conduits 16. Water conduits 16 are routed to air handlers 18, located on individual floors and within sections of building 10.

Air handlers 18 are coupled to ductwork 306 that is adapted to distribute air between the air handlers and may receive air from an outside intake (not shown). Air handlers 18 include heat exchangers that circulate cold water from chiller 12 and hot water from boiler 14 to provide heated or cooled air. Fans, within air handlers 18, draw air through the heat exchangers and direct the conditioned air to environments within building 10, such as spaces, apartments, or offices, to maintain the environments at a designated temperature. A thermostat 200, may be used to designate the temperature of the conditioned air. Thermostat 200 also may be used to control the flow of air through and from air handlers 18 and to diagnose mechanical or electrical problems with the air handlers 18. Other devices may, of course, be included in the system, such as control valves that regulate the flow of water and pressure and/or temperature transducers or switches that sense the temperatures and pressures of the water, the air, and so forth. Moreover, the control device may communicate with computer systems that are integrated with or separate from other building control or monitoring systems, and even systems that are remote from the building.

Figure 2:
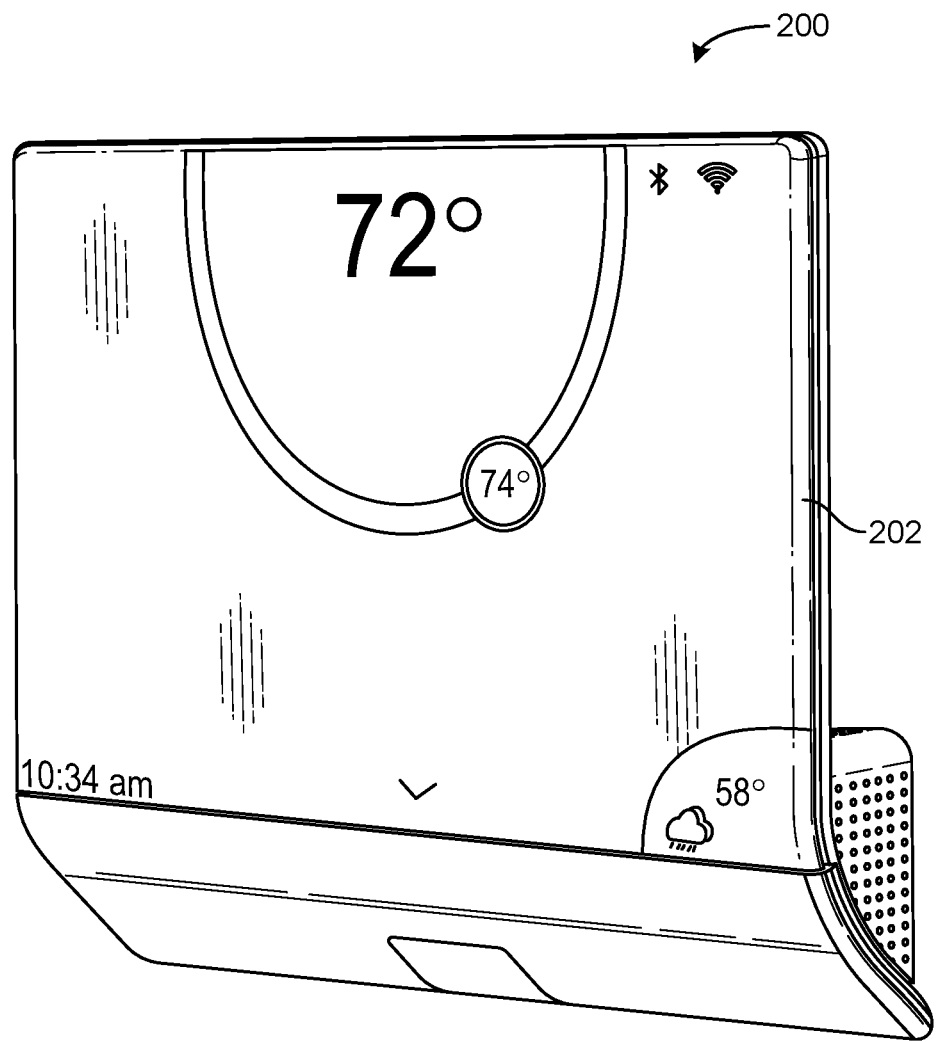
FIG. 2 is a drawing of a thermostat with a transparent cantilevered display, according to an exemplary embodiment.

FIG. 2 is a drawing of a thermostat 200 that includes a transparent cantilevered user interface 202. The user interface 202 may be an interactive display that can display information to a user and receive input from the user. The user interface 202 may be transparent such that a user can view information on the display and view the surface (e.g., a wall) located behind the display. Thermostats with transparent and cantilevered user interfaces are described in further detail in U.S. patent application Ser. No. 15/146,649 filed May 4, 2016, the entirety of which is incorporated by reference herein.

The user interface 202 can be a touchscreen or other type of electronic display configured to present information to a user in a visual format (e.g., as text, graphics, etc.) and receive input from a user (e.g., via a touch-sensitive panel). For example, the user interface 202 may include a touch-sensitive panel layered on top of an electronic visual display. A user can provide inputs through simple or multi-touch gestures by touching the user interface 202 with one or more fingers and/or with a stylus or pen. The user interface 202 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of user interface 202 allowing registration of touch in two or even more locations at once. The display may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the user interface 202 is configured to present visual media (e.g., text, graphics, etc.) without requiring a backlight.

Figure 3:
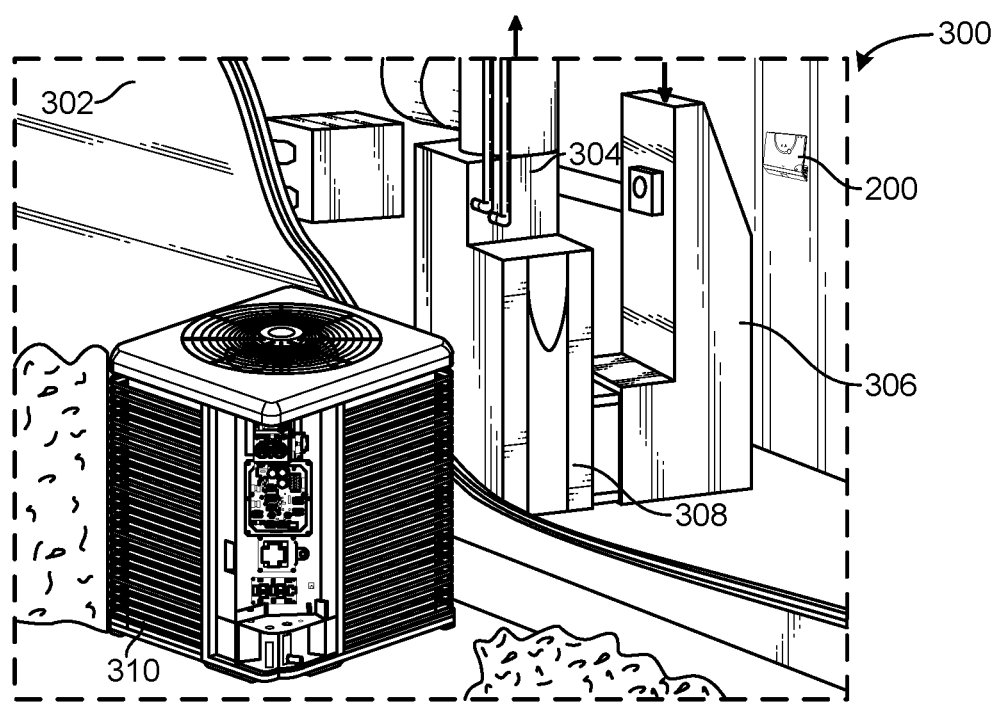
FIG. 3 is an illustration of a residential HVAC system with heat exchangers, according to an example embodiment.

FIG. 3 illustrates a residential heating and cooling system. The residential heating and cooling system may provide heated and cooled air to a residential structure, as well as provide outside air for ventilation and provide improved indoor air quality (IAQ) through devices such as ultraviolet lights and air filters. In general, a residence 302 will include refrigerant conduits that operatively couple an indoor unit 308 to an outdoor unit 310. Indoor unit 308 may be positioned in a utility space, an attic, a basement, and so forth. Outdoor unit 310 is typically situated adjacent to a side of residence 302 and is covered by a shroud to protect the system components and to prevent leaves and other contaminants from entering the unit. Refrigerant conduits transfer refrigerant between indoor unit 308 and outdoor unit 310, typically transferring primarily liquid refrigerant in one direction and primarily vaporized refrigerant in an opposite direction.

When the system shown in FIG. 3 is operating as an air conditioner, a coil in outdoor unit 310 serves as a condenser for recondensing vaporized refrigerant flowing from indoor unit 308 to outdoor unit 310 via one of the refrigerant conduits. In these applications, a coil of the indoor unit, designated by the reference numeral 32, serves as an evaporator coil. Evaporator coil 304 receives liquid refrigerant (which may be expanded by an expansion device, not shown) and evaporates the refrigerant before returning it to outdoor unit 310.

Outdoor unit 310 draws in environmental air through its sides as indicated by the arrows directed to the sides of the unit, forces the air through the outer unit coil using a fan (not shown), and expels the air as indicated by the arrows above the outdoor unit. When operating as an air conditioner, the air is heated by the condenser coil within the outdoor unit and exits the top of the unit at a temperature higher than it entered the sides. Air is blown over indoor coil 310 and is then circulated through residence 302 by means of ductwork 20, as indicated by the arrows entering and exiting ductwork 20. The overall system operates to maintain a desired temperature as set by system controller 22. When the temperature sensed inside the residence is higher than the set point on the thermostat (with the addition of a relatively small tolerance), the air conditioner will become operative to refrigerate additional air for circulation through the residence. When the temperature reaches the set point (with the removal of a relatively small tolerance), the unit will stop the refrigeration cycle temporarily.

When the unit in FIG. 3 operates as a heat pump, the roles of the coils are reversed. That is, the coil of outdoor unit 310 will serve as an evaporator to evaporate refrigerant and thereby cool air entering outdoor unit 310 as the air passes over the outdoor unit coil. Indoor coil 310 will receive a stream of air blown over it and will heat the air by condensing a refrigerant.

Figure 4:
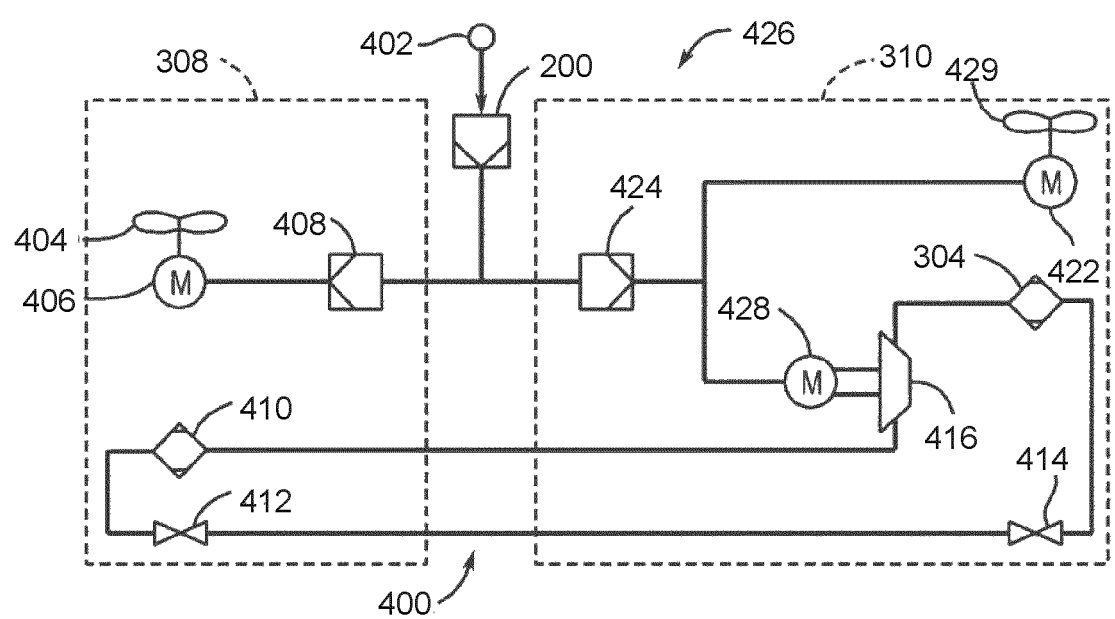
FIG. 4 is a block diagram of a HVAC system that employs a control device such as the thermostat of FIG. 2, according to an example embodiment.

FIG. 4 is a block diagram of an HVAC system 426 that includes the thermostat 200, indoor unit 308 functioning as an air handler, and outdoor unit 310 functioning as a heat pump. Refrigerant flows through system 426 within a closed refrigeration loop 400 between outdoor unit 310 and indoor unit 308. The refrigerant may be any fluid that absorbs and extracts heat. For example, the refrigerant may be hydro fluorocarbon (HFC) based R-410A, R-407C, or R-134a.

The operation of indoor and outdoor units 308 and 310 is controlled by control circuits 408 and 424, respectively. The control circuits 408 and 424 may execute hardware or software control algorithms to regulate the HVAC system. In some embodiments, the control circuits may include one or more microprocessors, analog to digital converters, non-volatile memories, and interface boards. In certain embodiments, the control circuits may be fitted with or coupled to auxiliary control boards that allow conventional VAC wiring to be controlled through serial communications.

The control circuits 408 and 424 may receive control signals from thermostat 200 and transmit the signals to equipment located within indoor unit 308 and outdoor unit 310. For example, outdoor control circuit 424 may route control signals to a motor 422 that powers a fan 429 and to a motor 428 that powers a compressor 416. Indoor control circuit 408 may route control signals to a motor 406 that powers a fan 404. The control circuits also may transmit control signals to other types of equipment such as valves 412 and 414, sensors, and switches. In some embodiments, as will be described below, such control signals are based on whether a thermostat provides an indication of the occupancy of the building.

In some embodiments, thermostat 200 may communicate with control circuits 408 and 424 by transmitting communication packets over a serial communication interface. Thermostat 200 may function as the master system controller while control circuits 408 and 424 operate as slave devices. In certain embodiments, thermostat 200 may send a ping message to discover connected slave devices and their properties. For example, control circuits 408 and 424 may transmit an acknowledgement message in response to receiving a ping message from control device 200. Control circuits 408 and 424 also may transmit information, in response to requests from thermostat 200, identifying the type of unit and specific properties of the unit. For example, control circuit 424 may transmit a signal to thermostat 200 indicating that it controls a two-stage heat pump with auxiliary heat and a bonnet sensor. Control circuits 408 and 424 also may transmit signals identifying terminal connections and jumper settings of the control circuits.

Thermostat 200 may operate to control the overall heating and cooling provided by indoor and outdoor units 308 and 310. Indoor and outdoor units 308 and 310 include coils 304 and 410, respectively, that both operate as heat exchangers. The coils may function either as an evaporator or a condenser depending on the heat pump operation mode. For example, when heat pump system 426 is operating in cooling (or "AC") mode, outside coil 304 functions as a condenser, releasing heat to the outside air, while inside coil 410 functions as an evaporator, absorbing heat from the inside air. When heat pump system 426 is operating in heating mode, outside coil 304 functions as an evaporator, absorbing heat from the outside air, while inside coil 410 functions as a condenser, releasing heat to the inside air. A reversing valve may be positioned on closed loop 400 to control the direction of refrigerant flow and thereby to switch the heat pump between heating mode and cooling mode.

Heat pump system 426 also includes two metering devices 412 and 414 for decreasing the pressure and temperature of the refrigerant before it enters the evaporator. The metering devices also regulate the refrigerant flow entering the evaporator so that the amount of refrigerant entering the evaporator equals, or approximately equals, the amount of refrigerant exiting the evaporator. The metering device used depends on the heat pump operation mode. For example, when heat pump system 426 is operating in cooling mode, refrigerant bypasses metering device 414 and flows through metering device 412 before entering inside coil 410, which acts as an evaporator. In another example, when heat pump system 426 is operating in heating mode, refrigerant bypasses metering device 412 and flows through metering device 414 before entering outside coil 304, which acts as an evaporator. According to other example embodiments, a single metering device may be used for both heating mode and cooling mode. The metering devices typically are thermal or electronic expansion valves, but also may be orifices or capillary tubes.

The refrigerant enters the evaporator, which is outside coil 304 in heating mode and inside coil 410 in cooling mode, as a low temperature and pressure liquid. Some vapor refrigerant also may be present as a result of the expansion process that occurs in metering device 412 or 414. The refrigerant flows through tubes in the evaporator and absorbs heat from the air changing the refrigerant into a vapor. In cooling mode, the indoor air flowing across the multichannel tubes also may be dehumidified. The moisture from the air may condense on the outer surface of the multichannel tubes and consequently be removed from the air.

After exiting the evaporator, the refrigerant flows into compressor 416. Compressor 416 decreases the volume of the refrigerant vapor, thereby, increasing the temperature and pressure of the vapor. The compressor may be any suitable compressor such as a screw compressor, reciprocating compressor, rotary compressor, swing link compressor, scroll compressor, or turbine compressor.

From compressor 416, the increased temperature and pressure vapor refrigerant flows into a condenser, the location of which is determined by the heat pump mode. In cooling mode, the refrigerant flows into outside coil 304 (acting as a condenser). Fan 429, which is powered by motor 422, draws air across the tubes containing refrigerant vapor. According to certain example embodiments, the fan may be replaced by a pump that draws fluid across the multichannel tubes. The heat from the refrigerant is transferred to the outside air causing the refrigerant to condense into a liquid. In heating mode, the refrigerant flows into inside coil 410 (acting as a condenser). Fan 404, which is powered by motor 406, draws air across the tubes containing refrigerant vapor. The heat from the refrigerant is transferred to the inside air causing the refrigerant to condense into a liquid.

After exiting the condenser, the refrigerant flows through the metering device (414 in heating mode and 412 in cooling mode) and returns to the evaporator (outside coil 304 in heating mode and inside coil 410 in cooling mode) where the process begins again.

In both heating and cooling modes, motor 428 drives compressor 416 and circulates refrigerant through reversible refrigeration/heating loop 400. The motor may receive power either directly from an AC or DC power source or from a variable speed drive (VSD). The motor may be a switched reluctance (SR) motor, an induction motor, an electronically commutated permanent magnet motor (ECM), or any other suitable motor type.

The operation of motor 428 is controlled by control circuit 424. Control circuit 424 may receive control signals from thermostat 200. In certain embodiments, thermostat 200 may receive information from sensors 402 that measure the ambient indoor air temperature and various indicators of the presence of the occupants in the building. Thermostat 200 then compares the air temperature to the temperature set point (which may be input by a user) and engages compressor motor 428 and fan motors 406 and 424 to run the cooling system if the air temperature is above the temperature set point. In heating mode, thermostat 200 compares the air temperature from sensor 402 to the temperature set point and engages motors 428, 406, and 422 to run the heating system if the air temperature is below the temperature set point.

Thermostat 200 may also receive information from sensors 402 that measures various indicators of occupancy inside of a building. According to an example embodiment, sensors 402 include a gas sensor capable of measuring the concentration level of a human-generated gas. The control device compares the concentration level to a baseline established by the methods disclosed herein to determine if an occupant is within the building. If the concentration level indicates that an occupant is in the building, the thermostat 200 may compare the air temperature as measured by the sensing devices 402 to a first set-point (e.g., a "user-present" setpoint) and engage the motors 428, 406, and 422 to run the heating and/or cooling system if the temperature differs from the user-present setpoint. However, if the concentration level indicates that an occupant is not in the building, the thermostat 200 may compare the air temperature as measured by the sensing device 402 to a second setpoint (e.g., a "user-not-present" setpoint) and engages the motors 428, 406, and 422 to run the heating and/or cooling system if the temperature differs from the user-not-present setpoint.

In an embodiment, the user-not-present setpoint is set relative to the user-present set point to enable the HVAC system to conserve energy. As such, in cooling mode, the user-not-present setpoint may be higher than the user-present setpoint and, in heating mode, the user-not-present setpoint may be lower than the user-present setpoint. Given this, it is crucial for the thermostat 200 to accurately determine if an occupant is present in the building. Traditional thermostats include unreliable means for detecting an occupant. For example, a traditional thermostat may include a passive infrared sensor. Such sensors, however, are ineffective if the building contains partitions or multiple rooms that block the infrared signals. To alleviate such deficiencies, the thermostat 200 disclosed herein receives data from a different type of sensor. Further, the thermostat 200 may include various modules described below for intelligently adapting various thresholds to determine whether occupants are present. Thus, the thermostat disclosed herein provides for efficient control of the HVAC system 426 by providing more accurate indications of occupancy than in current systems.

The control circuit 408 and themrostat 200 also may initiate a defrost cycle when the system is operating in heating mode. When the outdoor temperature approaches freezing, moisture in the outside air that is directed over outside coil 304 may condense and freeze on the coil. Sensors may be included within outdoor unit 310 to measure the outside air temperature and the temperature of outside coil 304. These sensors provide the temperature information to the control circuit 424 which determines when to initiate a defrost cycle.

Thermostat Control With Occupation Detection Via Proxy

Figure 5:
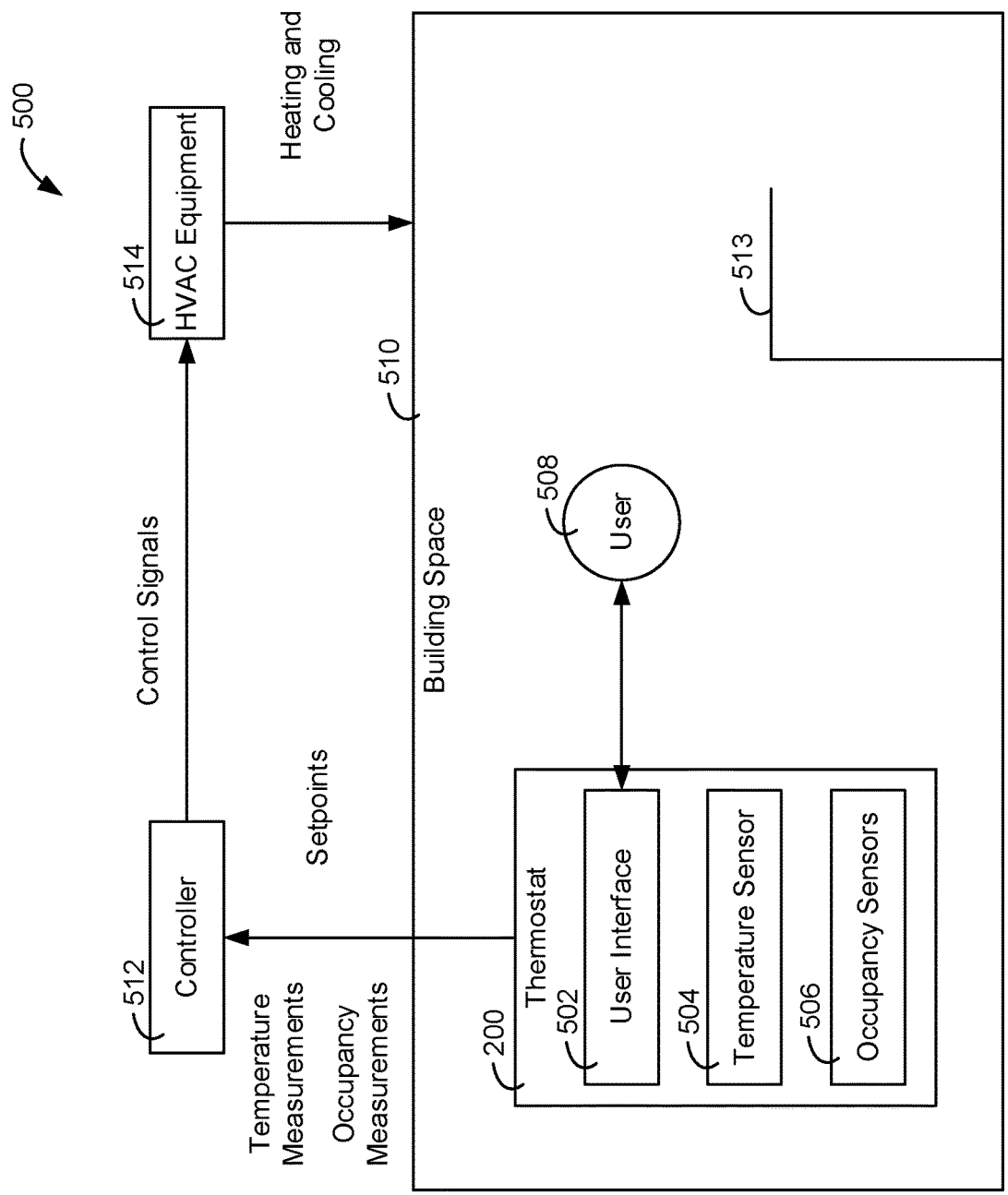
FIG. 5 is a block diagram of a system for controlling the temperature of a building space using the thermostat of FIG. 2, according to an example embodiment.

Referring now to FIG. 5, a system 500 for monitoring and controlling the temperature of a building space 510 is shown, according to some embodiments. System 500 is shown to include a thermostat 200 installed within a building space 510. Typically, thermostat 200 is mounted on a wall within building space 510. In the example shown, the building space 510 includes at least one partition 513. The partition may, for example, separate one room in the building space 510 from another. In the example shown, the building space 510 includes a single thermostat 200. Thermostat 200 is shown to include a user interface 502, a temperature sensor 504, and an occupancy sensor 506. User interface 502 includes an electronic display for presenting information to a user 508 and one or more physical input devices (e.g., a rotary knob, pushbuttons, manually-operable switches, etc.) for receiving input from a user 508. Temperature sensor 504 measures the temperature of building space 510 and provides the measured temperature to user interface 502.

The occupancy sensors 506 are configured to measure various indicators of occupancy within the building space 510. One such sensor may include a proximity sensor. The proximity sensor may emit infrared radiation and be configured to detect reflections off of an occupant. However, if an occupant (e.g., the user 508) is behind the partition 513, the radiation emitted by the occupancy sensor 506 will not reach the occupant and the thermostat 200 will incorrectly determine that there are no occupants in the building space 510. Thus, the systems and methods disclosed herein propose including multiple occupancy sensors 506 that detect occupancy via various other proxies.

One such other proxy may include a concentration level of a human-generated gas. Accordingly, in one embodiment, occupancy sensor 506 includes a gas sensor. The gas sensor may include a nondispersive infrared (NDIR) carbon dioxide sensor including an air intake, air outtake, with a volume between the air intake and the air outtake. A radiation source may radiate at a predetermined intensity through the volume. The amount of radiation absorbed by the air in the volume may be proportional to the concentration of carbon dioxide in the air. Thus, by measuring the intensity of the radiation transmitted from the source to a detector, the gas sensor may determine a concentration (e.g., in parts-per-million or "PPM") of carbon dioxide in the air. As will be described below, such concentration measurements may be used to both establish a baseline concentration level and to determine whether occupants are present in the building space 510. A more detailed explanation of the occupancy sensors 506 will be provided below in relation to FIG. 6.

The thermostat 200 communicates with a controller 512. In various embodiments, the controller 512 may be integrated with thermostat 200 or may exist as a separate controller (e.g., a field and equipment controller, a supervisory controller, etc.) that receives input from the thermostat 200. The thermostat 200 may send temperature measurements and temperature setpoints to the controller 512. In turn, the controller 512 generates control signals for HVAC equipment 514. In an example embodiment, the HVAC equipment 514 includes the HVAC system 426 discussed above in relation to FIG. 3. In such an embodiment, the control signals may cause control circuits 408 or 424 to control the operation of motors 50, 54, and 502 so as to change the amount of heating or cooling provided to the building space 510. In some embodiments, thermostat 200 directly controls HVAC equipment 514 to control environmental conditions of building space 510. For example, thermostat 200 may include some and/or all of the functionality of controller 512 necessary to control HVAC equipment 514.

Figure 6:
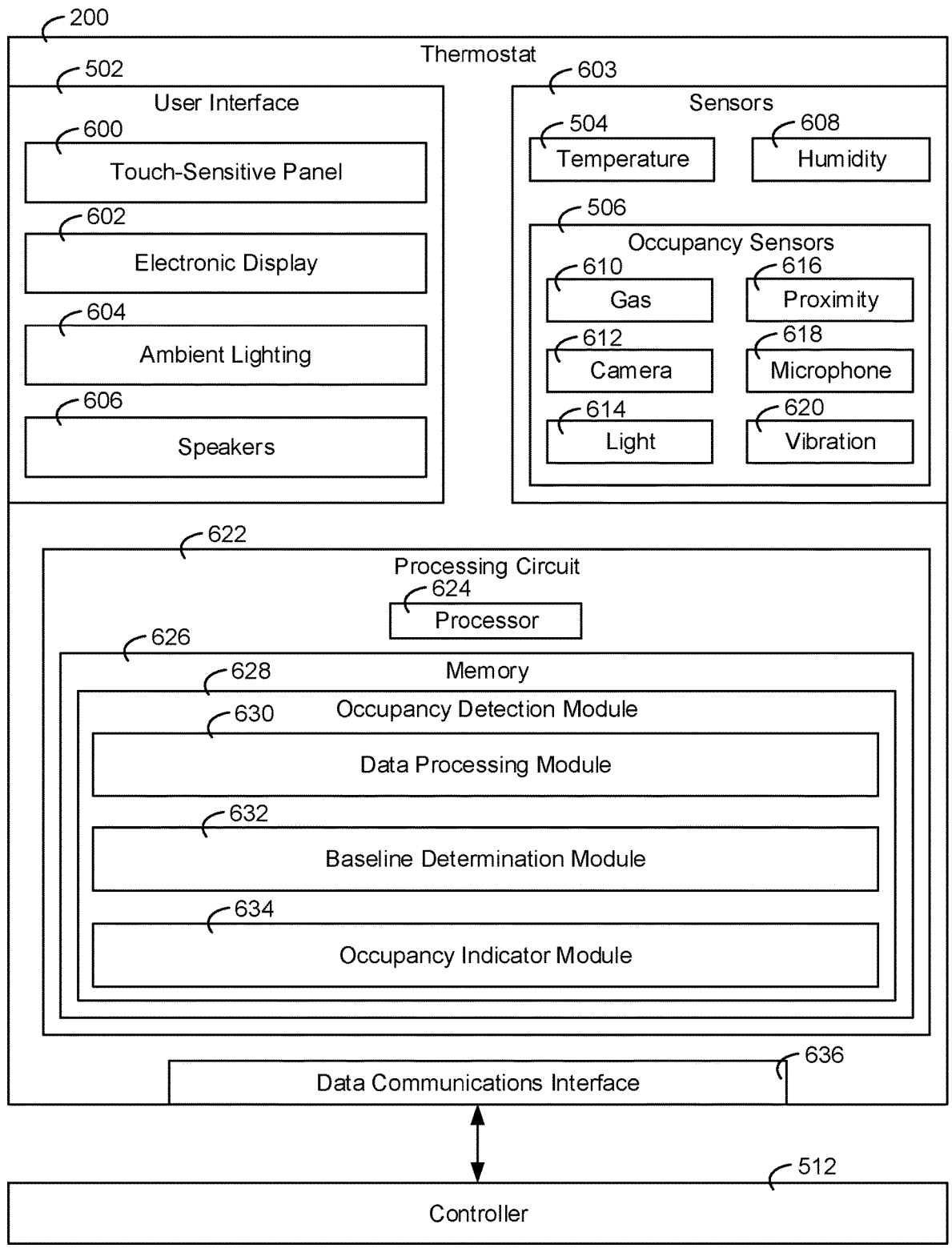
FIG. 6 is a block diagram of the thermostat of the system of FIG. 5, according to an example embodiment.

Referring now to FIG. 6 a block diagram illustrating the thermostat 200 in greater detail is shown, according to some embodiments. Thermostat 200 is shown to include a variety of user interface devices 502 and sensors 603. User interface devices 502 may be configured to receive input from the user 508 and provide outputs to the user 508 in various forms. For example, user interface devices 502 are shown to include a touch-sensitive panel 600, electronic display 602, ambient lighting 604, and speakers 606. In some embodiments, user interface devices 502 include a microphone configured to receive voice commands from a user, a keyboard or buttons, switches, dials, or any other user-operable input devices. It is contemplated that user interface devices 502 may include any type of device configured to receive input from a user and/or provide an output to a user in any of a variety of forms (e.g., touch, text, video, graphics, audio, vibration, etc.).

Sensors 603 may be configured to measure a variable state or condition of the environment in which the thermostat 200 is installed (e.g., the building space 510). Sensors 603 may be integrated into the thermostat 200 or be remote from the thermostat 200 and communicate with the thermostat 200 (e.g., wirelessly via the data communications interface 458). In the example shown, the thermostat 200 includes the temperature sensor 504 and a humidity sensor 608 for measuring qualities of the air in the building space 510. In various other embodiments, the thermostat 200 may include various other sensors for measuring additional qualities of the air in the building space 510. For example, the thermostat 200 may also include an air quality sensor configured to detect the presence of various impurities in the air (e.g., nitrogen dioxide, carbon monoxide, etc.).

Additionally, the thermostat 200 includes a plurality of occupancy sensors 506. The occupancy sensors 506 are configured to generate signals that are based at least in part on an indication of an occupant being in the building space 510. As discussed above, occupancy sensors 603 may include a gas sensor 610 that measures the concentration level of at least one human-generated gas in the air of the building space 510. In some embodiments, the thermostat 200 includes multiple gas sensors 610. For example, in addition to the carbon dioxide sensor discussed above, the thermostat may further include an oxygen sensor (e.g., an optical oxygen electrical sensor). The gases detected by the gas sensors 610 can include volatile organic compounds (VOCs) (e.g., methanol, isoprene, acetone, ethanol, and/or other alcohols), carbon dioxide ($CO_2$), nitrogen dioxide ($NO_2$), oxygen (O), etc. When humans breathe out, they may emit various gases indicative of the presence of the occupant. The occupancy detection via gases as described herein can use any type of gas as described herein.

Thus, the thermostat 200 may receive indicators of a carbon dioxide concentration level and an oxygen concentration level in the air. Fresh air is about 0.04% concentration by volume of carbon dioxide and about 20.9% concentration by volume of oxygen. The air humans exhale, in contrast, is about 4-5.5% concentration by volume of carbon dioxide and about 13.5-16% concentration by volume of oxygen. Thus, the closer the air concentration levels in a particular room or building get to the latter of these concentrations, the more likely that there are occupants in the building space. Accordingly, baselines for both oxygen concentration levels as well as carbon dioxide concentration levels may be established for the building space 510 via the methods described herein.

Occupancy sensors 506 further include a camera 613. Camera 612 may capture digital still images and/or videos of the building space 510. The thermostat 200 may further include various image processing modules (e.g., in the data processing module 630 described below) configured to analyze the image captured by the camera to determine if an occupant is present in the building space 510. Occupancy sensors 506 may further include a light sensor 614 (e.g., a photodiode) configured to generate a signal when certain wavelengths of light that are indicative of occupancy (e.g., lights emitted from displays of a user computing device) are detected, a proximity sensor 616, a microphone 618, and a vibration sensor 620. In some embodiments, the occupancy sensors 506 include a motion sensors, e.g., a passive infrared (PIR) sensor.

Still referring to FIG. 6, thermostat 200 is shown to include a data communications interface 636 and a processing circuit 622. Data communications interface 636 may include wired or wireless interfaces (e.g., jacks, antennas, transmitters, receivers, transceivers, wire terminals, etc.) for conducting data communications with various systems, devices, or networks. For example, data communications interface 636 may include an Ethernet card and port for sending and receiving data via an Ethernet-based communications network and/or a Wi-Fi transceiver for communicating via a wireless communications network. Data communications interface 636 may be configured to communicate via local area networks or wide area networks (e.g., the Internet, a building WAN, etc.) and may use a variety of communications protocols (e.g., BACnet, IP, LON, etc.). Communications interface 636 may include a network interface configured to facilitate electronic data communications between the thermostat 200 and various external systems or devices (e.g., the controller 512 and/or HVAC equipment 418).

In some embodiments, data communications interface 636 includes various switches, relays, triacs, and/or any other controlling component for controlling controller 512 and/or HVAC equipment 514. For example, data communications interface 636 can be configured to switch various heating stages (e.g., heating stage 1 (W1), heating stage 2 (W2), etc.) cooling stages (cooling stage 1 (Y1), cooling stage 2 (Y2), etc.), fan control (W), reversing value control (O/B), and/or any other control. Furthermore, the data communications interface 636 can include a common wire connection and/or a power (power for cooling (RC), power for heating (RH), R, etc.).

Processing circuit 622 is shown to include a processor 624 and memory 448. Processor 624 may be a general purpose or specific purpose processor, an application specific integrated circuit (ASIC), one or more field programmable gate arrays (FPGAs), a group of processing components, or other suitable processing components. Processor 624 may be configured to execute computer code or instructions stored in memory 626 or received from other computer readable media (e.g., CDROM, network storage, a remote server, etc.).

Memory 626 may include one or more devices (e.g., memory units, memory devices, storage devices, etc.) for storing data and/or computer code for completing and/or facilitating the various processes described in the present disclosure. Memory 626 may include random access memory (RAM), read-only memory (ROM), hard drive storage, temporary storage, non-volatile memory, flash memory, optical memory, or any other suitable memory for storing software objects and/or computer instructions. Memory 626 may include database components, object code components, script components, or any other type of information structure for supporting the various activities and information structures described in the present disclosure. Memory 626 may be communicably connected to processor 624 via processing circuit 622 and may include computer code for executing (e.g., by processor 624) one or more processes described herein. For example, memory 626 is shown to include an occupancy detection module 628.

The occupancy detection module 628 is structured to cause the processor 624 to determine if an occupant is located within the building space 510 based on the sensor signals generated by the occupancy sensors 506. In this regard, the occupancy detection module 628 is shown to include a data processing module 630, a baseline determination module 632, and an occupancy indicator module 634. The data processing module 630 is configured to perform various operations on data returned by the occupancy sensors 506 to determine if the data is indicative of an occupant being present in the building space. For example, the data processing module 630 may include an image processing module configured process images captured by the camera 434. For example, data processing module 630 may include an image processing algorithm that searches images captured by the camera 612 for occupant signatures. An occupant signature may include any attribute that is typically associated with an occupant such as, but not limited to, a face, pair of arms, a movement pattern, pieces of clothing, or any combination thereof. To illustrate, the image processing algorithm may scan an image for flesh-colored groups of pixels to determine if an occupant is present.

Data processing module 630 may further include an audio processing module configured to process audio signals captured by the microphone 618. For example, the data processing module 630 may include voice recognition software configured to recognize the voices of various common occupants of the building space 510. As such, the microphone may identify an occupant when the occupant speaks. Alternatively, the data processing module 630 may be configured to determine the direction from which a sound captured by the microphone 618 came from, and determine that the sound was emitted by an occupant based on predefined parameters (e.g., from a height commonly associated with an occupant). Further, the data processing module 630 may process signals produced by the vibration sensor 620 to determine if those signals are indicative of an occupant being present. For example, the vibration sensor 620 may be configured to pick up whenever an occupant takes a step within the building space 510, and the data processing module 630 may be configured to recognize patterns in the signals from the vibration sensor 620 that are indicative of an occupant (e.g., a series of steps within a predetermined frequency range).

Occupancy detection module 628 is further shown to include a baseline determination module 632. The baseline determination module 632 is configured to determine a baseline concentration level for various gases detected by the gas sensors 610. For example, the baseline determination module 632 may keep a global average of carbon dioxide concentration levels in the building space 510. The global average may include a weighted average of all the concentration level values measured by the gas sensors 610. Values closer to an established baseline of the building space 510, for example, may receive greater weight than values further from the established baseline. In some embodiments, the baseline determination module 632 may continuously update the global average value (e.g., daily, weekly, monthly, etc.). In some embodiments, the baseline determination module maintains a rolling average over a predetermined period.

In some embodiments, baseline determination module 632 is configured to determine circumstantial concentration baselines. One such circumstantial concentration baseline may include a no-occupancy carbon dioxide concentration level baseline. Thus, the baseline determination module 632 is configured to identify various time periods in which there are no occupants in the building space 510, and keep an average of the carbon dioxide concentration levels measured by the gas sensor 610 during those times. In some embodiments, the baseline determination module 632 is configured to identify periods of no occupancy based solely on carbon dioxide concentration levels. When at least one occupant is within the building space 510 for a prolonged period, the carbon dioxide concentration within the air of the building space will generally be slightly higher than when there are no occupants in the building space for a prolonged period. Assuming that there are minimal other sources of carbon dioxide production in the building space 510, if an occupant leaves the building space 510, the carbon dioxide concentration will slowly decline to a steady state no-occupancy value. Accordingly, the baseline determination module 632 is configured to monitor the concentration values returned by the gas sensor 610 for steady state local minimums. For example, if successive readings over the course of a predetermined period are within a predetermined range of one another and average to a value that is lower than a previously-determined steady state average, the baseline determination module 632 may identify that steady state average as no-occupancy value. A plurality of such values may be averaged together to establish the no-occupancy carbon dioxide concentration level baseline. As with the global averages discussed above, the baseline determination module 632 may continuously update the baseline value.

In some embodiments, the baseline determination module 632 identifies periods of no occupancy within the building space 510 based on inputs from other occupancy sensors 506. For example, the camera 612 may generate an image of the building space 510, and the data processing module 630 may be unable to identify any indications of occupants. In such a case, the data processing module 630 may provide a no-occupancy input to the baseline determination module 632, and the baseline determination module 632 may incorporate a concentration level measured by the gas sensor 610 into a no-occupancy baseline. Similar procedures may be followed using the light sensor 614, proximity sensor 616, microphone 618, and/or vibration sensor 620. For example, if the vibration sensor 620 fails to detect any steps within a predetermined period (e.g., three hours) within a predetermined time interval (e.g., between 6:00 PM and 9:00 PM), a no-occupancy indication may be provided to the baseline determination module 632.

In some embodiments, the baseline determination module 632 relies on multiple indications of no occupancy prior to incorporating a concentration level into a baseline. For example, in one embodiment, all of the camera 612, proximity sensor 616, and microphone 618 must be unable to detect an occupant before the baseline determination module 632 incorporates a concentration level into a no-occupancy baseline. As such, greater reliability of no-occupancy baselines are ensured.

In some embodiments, similar procedures are used to establish an occupancy baseline concentration level. For example, the baseline determination module 632 may keep a rolling average (excluding outliers) of concentration levels returned by the gas sensor 610 when the other occupancy sensors (e.g., the camera 612, microphone 618, proximity sensor 616, light sensor 614, and/or vibration sensor 620) provide indications that an occupant is present in the building space 510.

Occupancy detection module 628 is further shown to include an occupancy indicator module 634. Occupancy indicator module 634 is configured to determine if there is an occupant in the building space 510 based on the sensor signals returned by the occupancy sensors 506 and to provide occupancy inputs to the controller 512. In some embodiments, the occupancy indicator module 634 determines whether an occupant is in the building space based solely on the analysis performed by the data processing module 630. For example, if an image captured by the camera 612 contains no indication of an occupant, or if no sounds captured by the microphone 618 within a predetermined period are indicative of an occupant, the occupancy indicator module may provide a no-occupancy input to the controller 512.

In some embodiments, the occupancy indicator module 634 is configured to compare concentration values measured by the gas sensors 610 to the baselines established by the baseline determination module 632 discussed above to determine whether there are occupants in the building space 510. If, for example, successive measurements (or a predetermined percentage of successive measurements) by the gas sensor 610 are more than a threshold amount above the no-occupancy baseline established by the baseline determination module 632, the occupancy indicator module 634 may provide an occupancy input to the controller 512. In some embodiments, the occupancy indicator module 634 may also compare the concentration levels returned by the gas sensor 610 to an occupancy baseline established by the baseline determination module 632. For example, if the concentration level is greater than the no-occupancy baseline but not within a predetermined threshold of the occupancy baseline, the occupancy indicator module 634 may provide an "unable to determine" message to the controller 512. In response, the controller 512 may operate the HVAC equipment 514 as if there were occupants in the building space 510. In some embodiments, the processing circuit 622 can include and perform some and/or all of the functionality of controller 512. In this regard, rather than providing data to controller 512 to perform control decisions, the thermostat 200 may perform the control itself and provide the control outputs, e.g., turning on a heating or cooling stage, to controller 512.

In some embodiments, occupancy indicator module 634 implements a model which indicates whether an occupant is present in the building space 510. For example, the input to the model may be data from the occupancy sensors 506 and the output of the model may be an indication of whether the occupant is present in the building space 510. The model can be a neural network (e.g., a convolutional neural network (CNN), a recurrent neural network (RNN), etc.), a Bayesian model, a decision tree, and/or any other type of model. The model may include various model parameters which, with the model and the occupancy data input, indicates whether an occupant is present in the building space 510. In some embodiments, the baseline determination module 632 determines a period where there is occupancy in the building space 510 (based on occupancy sensors 506) and then trains the model with a gas concentration level of the gas sensor 610 and the indication that there is no occupancy. This may develop, generate, and/or update the parameters for the model. Then, based on new gas concentration levels of the gas sensor 610, the occupancy indication module 634 can use the trained parameters, the model, and the new gas concentration levels to determine whether the occupant is within the building space 510. A model and model parameters can be used with any of the occupancy sensors 506.

In some embodiments, the functionality of the thermostat 200 is implemented in a smart ventilator. The smart ventilator may include the gas sensor 610 and can be configured to operate itself in order to ventilate a building based on air quality. For example, if, via the gas sensor 610, it is determined that the air quality is poor, the smart ventilator may operate to ventilate the building space 510 and improve the air quality of the building space 510. A building may include multiple smart ventilators, each configured to ventilate a particular area of a building. Since each of the smart ventilators may include a gas sensor 610, each smart ventilator can operate independently from each other. This causes only specific areas of the building to be ventilated as needed, realizing an energy reduction. In some embodiments, the thermostat 200 communications with one or multiple air quality sensors (e.g., the gas sensors (gas sensor 610) located within the thermostat 200 or otherwise communicating with the thermostat 200. The thermostat 200 can be configured to control one or multiple ventilators based on readings of the air quality sensors.

Figure 7:
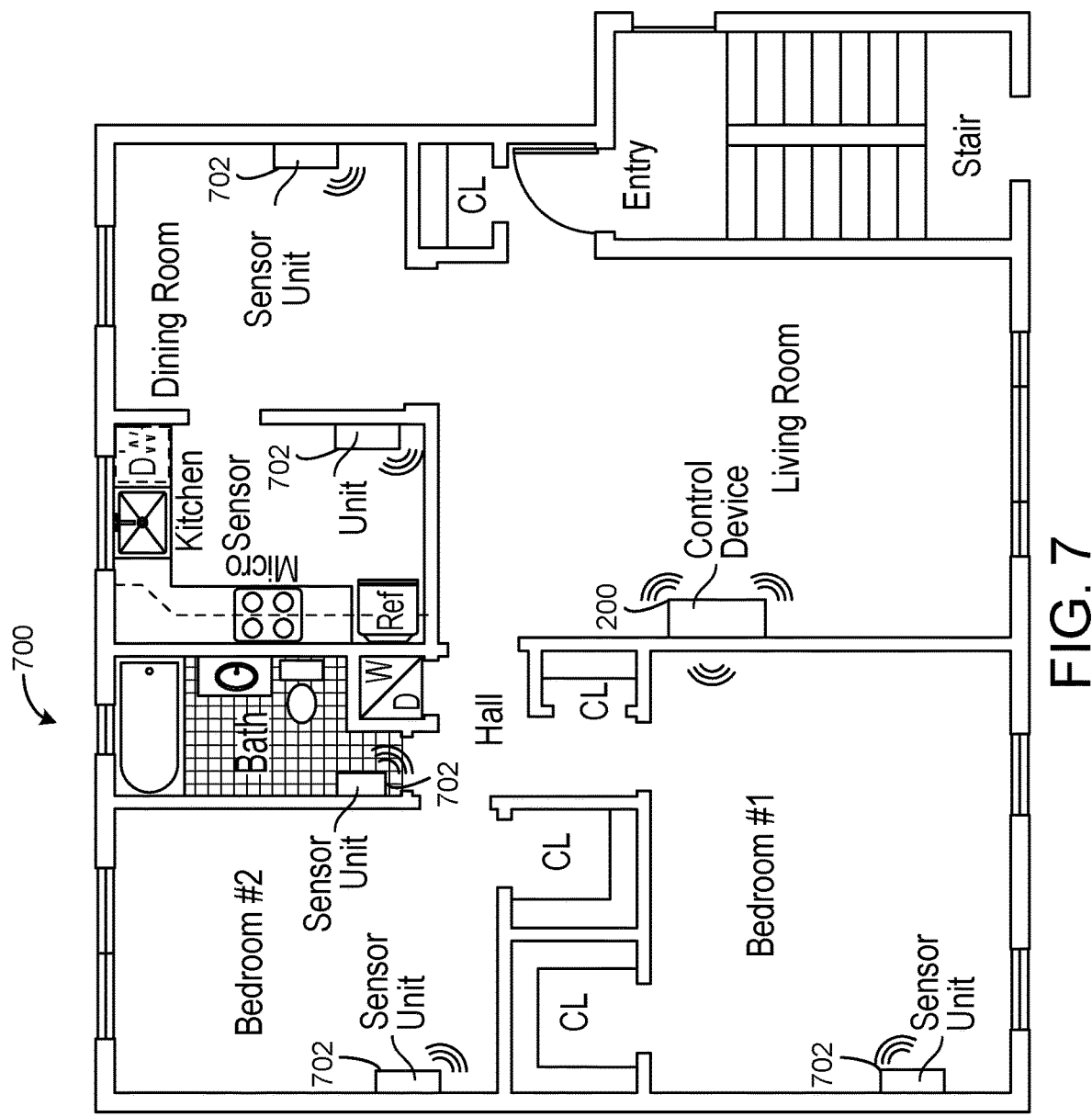
FIG. 7 is a block diagram of a floor plan of a building space, according to an example embodiment.

In some embodiments, the building space 510 may include a number of sets of sensors 603 to precisely measure various occupancy indications. Referring to FIG. 7, a floorplan 700 of a building space is shown, according to some embodiments. The building space is shown to include several different zones (e.g., rooms or areas) including a living room, a first bedroom, a second bedroom, a bathroom, a kitchen, and a dining room. A sensor unit 702 including the set of sensors 603 discussed above may be installed in each one of the rooms or zones. One zone may include a main control unit. For example, FIG. 7 shows a main control unit (e.g., thermostat 200) installed in the living room. The main control unit may serve as a central hub for monitoring environmental conditions, controlling various devices throughout the home, and/or tracking occupancy through multiple rooms and/or zones of the home.

Sensor units 702 including any combination of the sensors 603 discussed above may be installed in various rooms or zones in the home. For example, FIG. 7 shows a sensor unit installed in each of the bedrooms, the bathroom, the kitchen, and the dining room. In various embodiments, sensor units 702 are configured to relay image data, audio data, gas concentration data, or other data to thermostat 200 (e.g., by the external network discussed above). Thermostat 200 may locate the occupants and identify occupancy levels of various zones of the building based on the received signals. For example, each sensor unit 702 may have an associated identifier stored at the thermostat 200. Thus, based on various sensor signal values and the identifier, the thermostat 200 may determine a precise location for various occupants within the building. Using such locations, the thermostat 200 may control the heating and/or cooling provided to each of the zones. For example, each room or zone may include a separate air handling unit (e.g., as discussed above with respect to FIG. 1), and thermostat may provide control signals to control the amount of warm or cool air provided to each one of the zones via the methods disclosed herein.

Additionally, the thermostat 200 may maintain a separate concentration baseline established by the methods discussed above for each of the sensor units 702. As such, the thermostat 200 quickly identifies the occupancy status of the building space 510 because the gas emitted by the occupant does not have to diffuse as far to reach an occupancy sensor 506. In an embodiment, if any of the sensor units measures a concentration above the established baseline by more than a threshold, the thermostat 200 provides an occupancy input to the controller 512.

Figure 8:
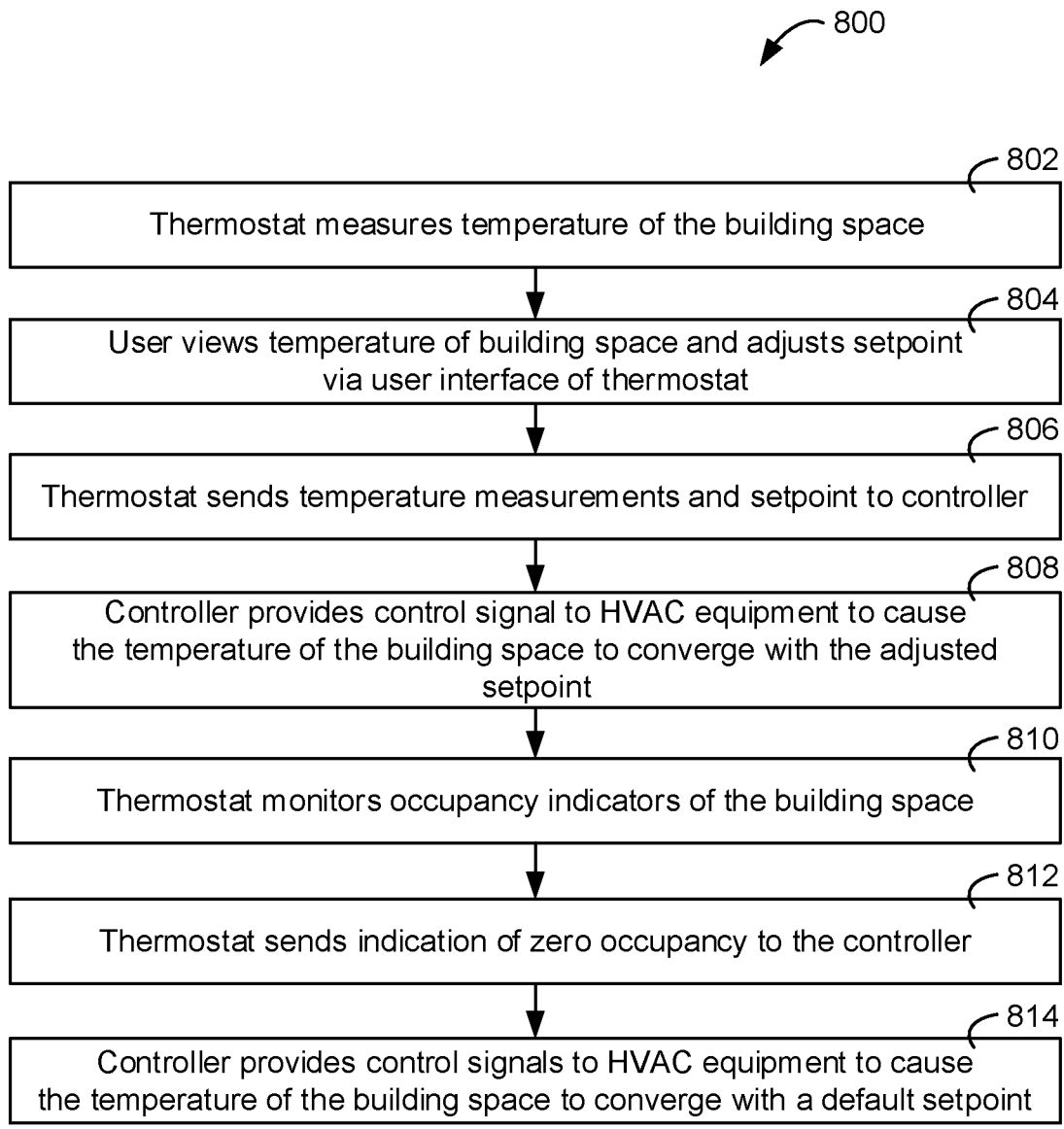
FIG. 8 is a flowchart of a process for controlling the temperature of a building space using the thermostat of the system of FIG. 5, according to an example embodiment.

Referring now to FIG. 8, a process 800 for monitoring and controlling the temperature of a building space is shown, according to an example embodiment. Process 800 may be performed by the thermostat 200, as described with reference to FIGS. 2-8. In process 800, thermostat 200 measures the temperature of the building space (step 802). User 508 views the measured temperature and adjusts the temperature setpoint via user interface 502 of thermostat 200 (step 804). Thermostat 200 sends the measured temperature and the setpoint to the controller 512 (step 806). Controller 512 uses the measured temperature and the setpoint to generate and provide a control signal to HVAC equipment 514 to cause the temperature of the building space 510 to converge with the user-input setpoint (step 808).

As steps 802-808 of the process 800 are performed, the thermostat 200 monitors various indicators of occupancy in the building space (step 810). Occupancy sensors 506 of the thermostat 200 may measure any aspect of the environment of the building space 510 that bears any sort of relationship to the occupancy of the building space 510. For example, gas sensors 610 may monitor a carbon dioxide concentration level in the building space 510, or a camera 612 may take an image of the building space 510.

Based on the indicators monitored at step 810, the thermostat 200 determines if there is at least one occupant in the building space 510 and, if not, sends a zero occupancy indication to the controller 512 (step 812). For example, the thermostat 200 (e.g., by the occupancy indicator module 634 discussed above) may determine that the concentration level of carbon dioxide measured by the gas sensor 610 is within a predetermined threshold of a no-occupancy baseline concentration established via the methods described herein. In response to such a determination, a no-occupancy indication may be transmitted to the controller 512. In some embodiments, the no occupancy indication includes a default no-occupancy setpoint that is different from the user-input setpoint provided at step 804. The default no-occupancy setpoint may be higher or lower than the user-input setpoint depending on whether the HVAC equipment 514 is in heating or cooling mode. In one embodiment, the no-occupancy setpoint is lower than the user-input setpoint when the HVAC equipment 514 is in heating mode and higher than the user-input setpoint when the HVAC equipment 514 is in cooling mode.

In response to the no occupancy indication, the controller 512 provides control signals to the HVAC equipment 514 to cause the temperature of the building space 510 to converge with the no-occupancy setpoint (step 814). As such, if the temperature to which the building space was brought at step 808 is higher than the no-occupancy setpoint, the control signals cause the HVAC equipment 514 to cool the air in the building space 510. For example, the control signal may slow the motor 428 to cause less refrigerant to be delivered to the outside coil 304. As such, less evaporation takes place, and less heat is provided to the building space 510.

Figure 9:
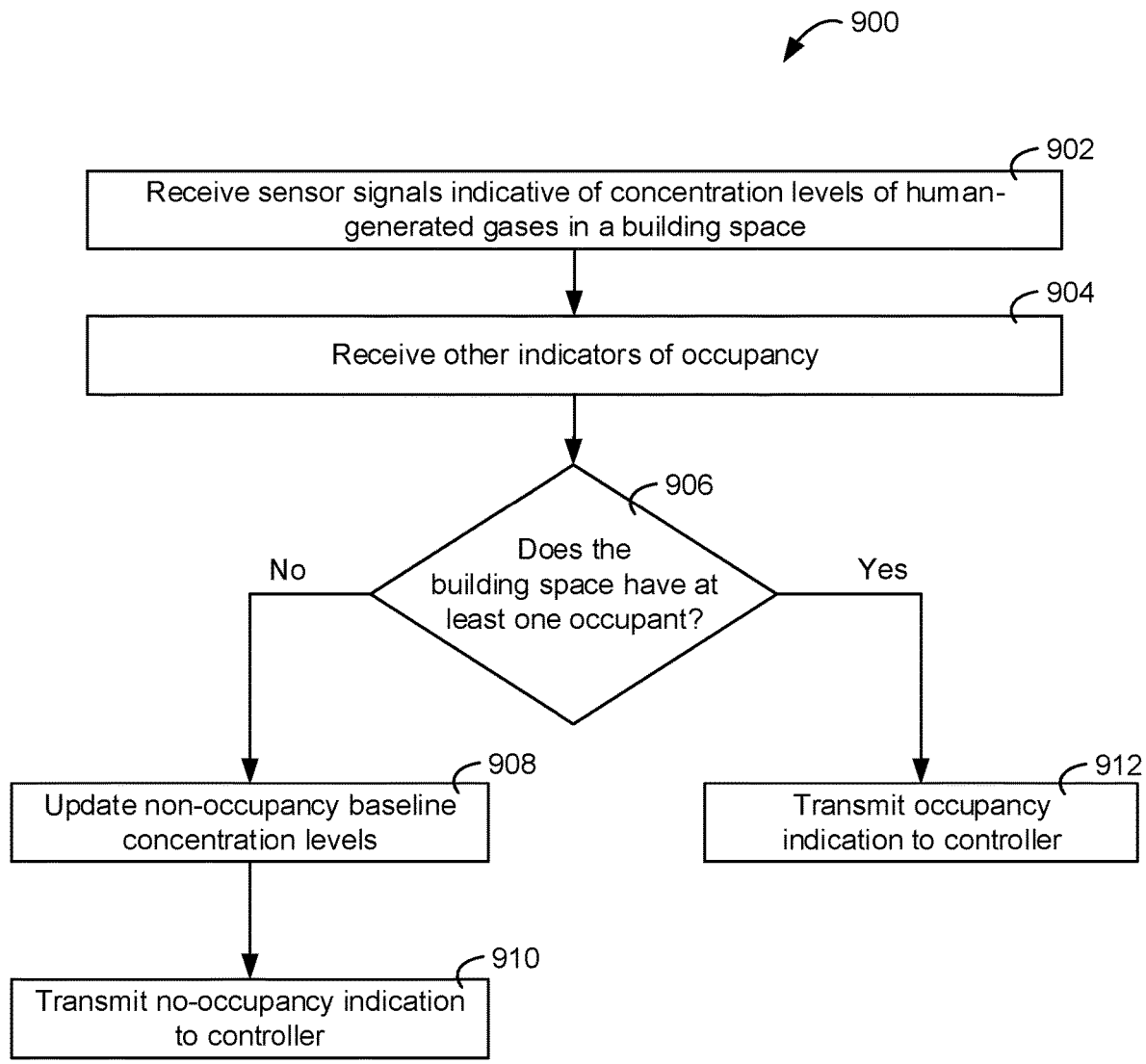
FIG. 9 is a flowchart of a process for measuring the baseline of an occupancy indicator with the thermostat of the system of FIG. 5, according to an example embodiment.

Referring now to FIG. 9, a flowchart of a process 900 for updating a concentration level baseline is shown, according to an example embodiment. Through the process 900, the thermostat 200 continuously updates a no-occupancy concentration baseline used (e.g., by the occupancy indicator module 634) to determine if a concentration level by the gas sensor 610 indicates that no occupant is present in the building space 510. As such, the thermostat 200 may accurately adjust temperature setpoints for controlling an HVAC system.

Process 900 begins when the thermostat 200 receives sensor signals indicative of concentration levels of human-generated gases in the building space (step 902). For example, a gas sensor 610 associated with the thermostat 200 may measure the concentration of carbon dioxide in the air of the building space 510. In some embodiments, another gas sensor 610 may measure an oxygen concentration in the building space 510.

As the concentration levels of human-generated gases are being measured, the thermostat 200 receives other indicators of occupancy (step 904). For example, a camera 612 of the thermostat 200 may capture an image of the building space 510 and process the image (e.g., by the data processing module 630 discussed above) to identify if there are any indications of occupants (e.g., flesh-colored patches of pixels, human-shaped edges, etc.) in the images. Any of the occupancy sensors 506 described herein may provide such an indicator of occupancy.

Based on the data received at steps 902-904, the thermostat determines if there are any occupants in the building space 510. In some embodiments, such a determination is based solely on the concentration level received at step 902. For example, if the concentration level received at 902 and a number of recently-measured concentration levels (e.g., a predetermined percentage of the most recent concentration measurements) are within a threshold of an established no-occupancy concentration baseline (e.g., established by the baseline determination module 632), the thermostat 200 (e.g., by the occupancy indicator module 634) may determine that there are no occupants in the building space.

In some embodiments, the determination is based on the other indicators of occupancy received at 904. For example, if processing of an image captured by the camera 612 reveals no indications of occupants within the image, the thermostat 200 may determine that no occupants are in the building space 510. In some embodiments, the thermostat relies on a plurality of the other indicators received at 904. For example, in one embodiment, both audio signals generated by the microphone 618 and images captured by the camera 612 must include no indication of any occupants for the thermostat 200 to determine that no occupants are present.

In some embodiments, the thermostat 200 relies on a combination of the concentration levels received at 902 and the other indicators received at 904. For example, in some embodiments, the concentration level received at 902 must be within a threshold of a pre-established no-occupancy baseline and some other indicator of occupancy must return a negative result. In some embodiments, whether the thermostat 200 relies on the other indicators depends on the concentration level received at 902. For example, if successive concentration levels measured by the gas sensor 610 continuously fluctuate by more than a threshold, the thermostat 200 may rely solely on another indicator measured by the other occupancy sensors 506.

If it is determined that no occupants are in the building space 510, the thermostat updates a non-occupancy baseline concentration level (step 908). For example, the thermostat 200 may incorporate the concentration level received at 902 into a rolling average of no-occupancy concentration levels. The rolling average may be a weighted average of concentration levels measured by the gas sensor 610 when there is no indication of an occupant over a predetermined period. For example, the concentration levels may receive weights based on their relationship to a most common no-occupant concentration level. Accordingly, the concentration level received may be assigned a weight and incorporated into the no-occupant baseline concentration. Additionally, the thermostat 200 provides a no-occupancy indication to the controller 512 (step 910). As such, the controller may provide different control signals (e.g., based on different setpoints) to the HVAC equipment 514 so as to cause the HVAC system 514 to conserve energy.

However, if the thermostat 200 determines that there is an occupant in the building space 510, an occupancy indication is provided to the controller 512 (step 912). Thus, the controller 512 will control the HVAC equipment 514 in accordance with occupant-preferred setpoints. In some embodiments, the thermostat also updates an occupancy baseline concentration level via methods similar to those discussed above with respect to the no-occupancy baseline concentration level.

Figure 10:
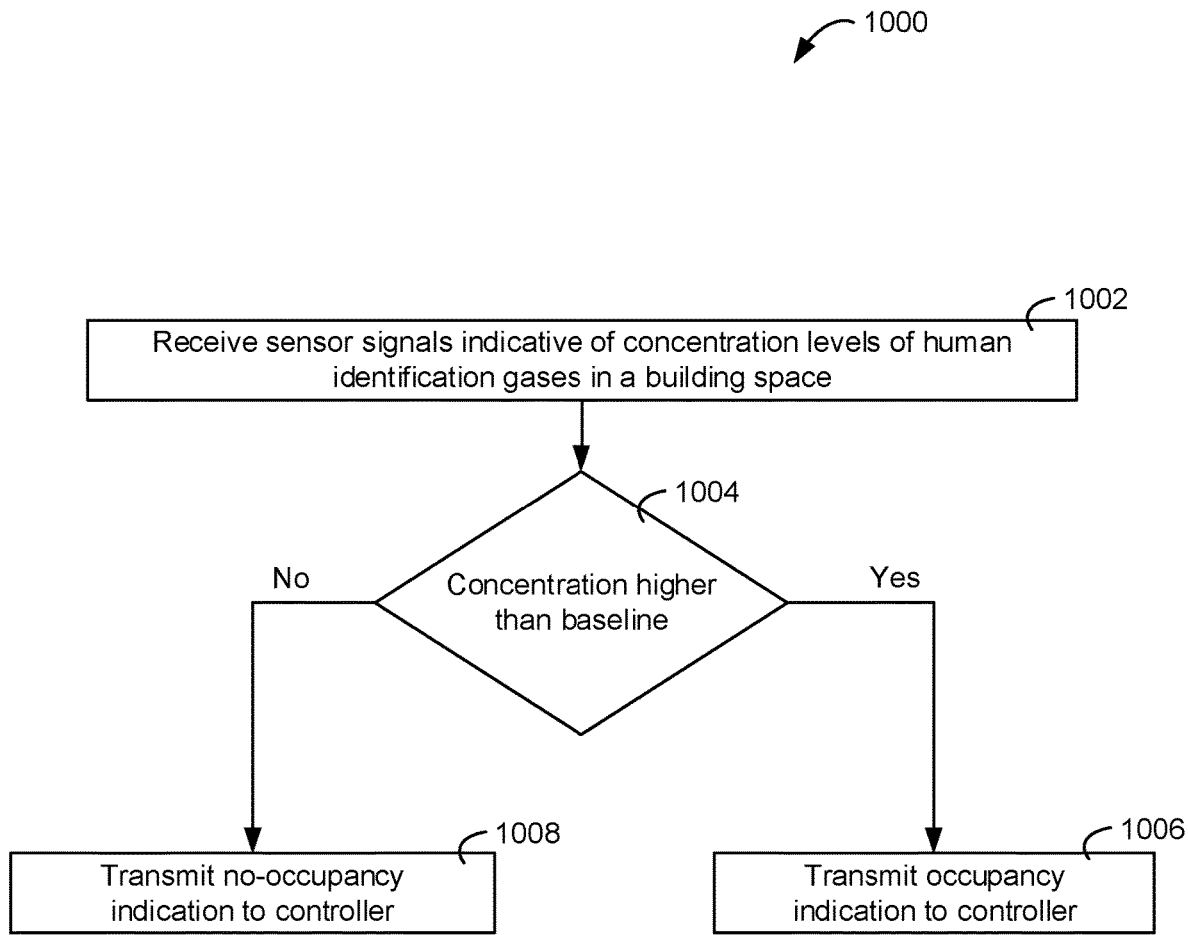
FIG. 10 is a flowchart of a process for providing an occupancy input to an HVAC system via the thermostat of the system of FIG. 5, according to an example embodiment.

Referring now to FIG. 10, a flowchart of a process 1000 of determining if an occupant is present in a building space is shown, according to an example embodiment. Through the process 1000, the thermostat 200 determines if an occupant is present in the building space 510 based on a gas concentration level measured by the gas sensor 432. Because gases in the air of the building space diffuse throughout the building space 510, the process 1000 enables the thermostat 200 to detect the presence of an occupant even if there is a partition 513 between the occupant and the thermostat 200. Thus, more the process 1000 enables the thermostat 200 to more reliably determine an occupancy status of the building space 510.

Process 1000 begins when the thermostat 200 receives sensor signals indicative of concentration levels of human-generated gases in the building space (step 1002). For example, a gas sensor 610 associated with the thermostat 200 may measure the concentration of carbon dioxide in the air of the building space 510. In some embodiments, another gas sensor 610 may measure an oxygen concentration in the building space 510. In some embodiments, the building space 510 includes a fan or a blower configured to aid the diffusion of human-generated gases throughout the building space 510. As a result, the gas concentration measured by the gas sensor 610 will more quickly respond to changes in the occupancy status of the building space 510. For example, an occupant enters the building space 510 and begins to emit carbon dioxide in an area of the building space 510 that is distant from the thermostat 200. Without the blower, the emitted carbon dioxide may take some time to reach the thermostat 200 as a result of unaided diffusion. However, the blower may cause the emitted carbon dioxide to reach the thermostat 200 more quickly. In some embodiments, the thermostat 200 can be configured to determine that one occupancy sensor (e.g., a proximity sensor 616) has detected occupancy. In response to detecting the occupancy by the proximity sensor 616, the thermostat 200 can be configured to cause the blower to operate to diffuse the gases so that the gas sensor 610 can sense the human gases. This can be done so that gas parameters (e.g., baselines) indicative of an occupant being present in the building can be appropriately updated.

In some embodiments, the building space 510 is equipped with multiple gas sensors 610 that are remote from the thermostat 200. Such sensors may transmit concentration readings to the thermostat wirelessly (e.g., via the data communications interface 636). In such embodiments, the thermostat 200 may maintain a separate no-occupancy baseline for each of the gas sensors 610.

After the sensor signals are received, the concentration levels are compared with an established baseline (step 1004). For example, the thermostat 200 may compare the concentration level received at 1002 to a no-occupancy baseline established via the process 900 discussed above. If the concentration level received at 1002 is greater than the no-occupancy baseline by more than a threshold, the thermostat 200 may transmit an occupancy indication to the controller (1006). As a result, the HVAC equipment 514 will operate to maintain air characteristics in the building space 510 (e.g., temperature, humidity, etc.) at a user-input setpoint. However, if the concentration level is not higher than the no-occupancy baseline, a no-occupancy indication is provided to the controller 512 (step 1008). As a result, the controller 512 will operate HVAC equipment 514 to maintain air characteristics in the building space 510 at different, more energy-efficient setpoints.

The construction and arrangement of the systems and methods as shown in the various example embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the example embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for controlling an environmental condition of a building space comprising:
   a proxy sensor configured to measure a proxy value indicating whether an occupant is within the building space;
   an occupancy sensor configured to measure an occupancy value indicating whether the occupant is within the building space, wherein the occupancy sensor is different than the proxy sensor; and
   a processing circuit configured to:
      determine whether the occupant is within the building space based on the occupancy value of the occupancy sensor;
      generate a proxy baseline based on a first proxy value measured via the proxy sensor, the proxy baseline, collects a plurality of proxy values measured via the proxy sensor, wherein the plurality of proxy values include the first proxy value; and
      averages the plurality of proxy values, wherein averaging the plurality of proxy values comprises performing a rolling average on the plurality of proxy values;
      compare a second proxy value measured via the proxy sensor and the proxy baseline; and
      control one or more pieces of building equipment to control the environmental condition of the building space based on a comparison of the second proxy value and the proxy baseline.

2. The controller of claim 1, wherein the occupancy sensor or the proxy sensor is at least one of a camera configured to capture a camera signal associated with the building space, a light sensor configured to measure light in the building space, a microphone configured to measure sound within the building space, and a vibration sensor configured to measure vibrations within the building space.

3. The controller of claim 1, wherein the occupancy sensor is a camera configured to capture one or more images of the building space, wherein the processing circuit is configured to determine whether the occupant is within the building space by searching the one or more images for an indication of the occupant within the one or more images.

4. The controller of claim 1, wherein the proxy sensor is a microphone configured to measure audio signals of the building space;
   wherein the processing circuit is configured to determine whether the occupant is within the building space by:
      determining one or more characteristics of the audio signals; and
      determining, based on the one of more characteristics, whether the occupant is within the building space.

5. The controller of claim 1, wherein the proxy sensor is a vibration sensor configured to measure vibration signals of the building space;
   wherein the processing circuit is configured to determine whether the occupant is within the building space based on the vibration signals.

6. The controller of claim 1, wherein the proxy sensor is a light sensor configured to measure a light level of the building space;
  wherein the processing circuit is configured to determine whether the occupant is within the building space based on the light level of the building space.

7. The controller of claim 1, wherein the occupancy sensor is at least one of a proximity sensor and a passive infrared (PIR) sensor configured to determine an indication of whether the occupant is within the building space, wherein the processing circuit is configured to determine whether the occupant is within the building space based on the indication of whether the occupant is within the building space determined by the at least one of the proximity sensor and the PIR sensor.

8. The controller of claim 1, wherein the processing circuit is configured to determine whether the occupant is within the building space based on the second proxy value measured via the proxy sensor and the proxy baseline by:
  determining that the occupant is within the building space in response to at least one of:
    determining that the occupant is within the building space based on the second proxy value and the proxy baseline; and
    determining that the occupant is within the building space based on the occupancy value of the occupancy sensor; and
  determining that the occupant is not within the building space in response to:
    determining that the occupant is not within the building based on the second proxy value and the proxy baseline; and
    determining that the occupant is not within the building space based on the occupancy value of the occupancy sensor.

9. The controller of claim 1, wherein the proxy sensor is a gas sensor configured to measure a concentration level of an occupant generated gas in the building space, the occupant generated gas generated by the occupant.

10. The controller of claim 9, wherein the concentration level of the occupant generated gas is at least one of a carbon dioxide (CO2) concentration level, a volatile organic compound (VOC) concentration level, and a nitrogen dioxide (NO2) concentration level.

11. The controller of claim 9, wherein the occupant generated gas is at least one of a volatile organic compound (VOC) concentration level and a nitrogen dioxide (NO2) concentration level.

12. The controller of claim 9, wherein the processing circuit is configured to:
  generate a model parameter based on the first proxy value measured via the proxy sensor in response to a determination that the occupant is not within the building space based on the occupancy value of the occupancy sensor by training a model with the first proxy value; and
  determine whether the occupant is within the building space based on the second proxy value, the model parameter, and the model.

13. The controller of claim 9, wherein the processing circuit is configured to:
  receive a plurality of concentration levels of the occupant generated gas via the gas sensor, each of the plurality of concentration levels associated with a particular time of a plurality of times; and
  update the proxy baseline based on the plurality of concentration levels by performing a rolling average on the plurality of concentration levels.

14. The controller of claim 13, wherein the processing circuit is configured to:
  receive a plurality of occupancy values via the occupancy sensor, each of the plurality of occupancy values indicating whether the occupant is within the building space;
  determine that the occupant is not within the building space based on the plurality of occupancy values;
  associate the plurality of concentration levels with times of no occupancy in the building space responsive to a determination that the occupant is not within the building space based on the plurality of occupancy values of the occupancy sensor; and
  update the proxy baseline based on the plurality of concentration levels of the proxy sensor.

15. A method for controlling an environmental condition of a building space, the method comprising:
  measuring, via a proxy sensor, a proxy value indicating whether an occupant is within the building space;
  measuring, via an occupancy sensor, an occupancy value indicating whether the occupant is within the building space, wherein the occupancy sensor is different than the proxy sensor; and
  determining, by a processing circuit, whether an occupant is within the building space based on the occupancy value of the occupancy sensor, wherein the occupancy sensor is configured to measure the occupancy value indicating whether the occupant is within the building space;
  generating, by the processing circuit, a proxy baseline based on a first proxy value measured via the proxy sensor, wherein the processing circuit
    collects a plurality of proxy values measured via the proxy sensor, wherein the plurality of proxy values include the first proxy value; and
    averages the plurality of proxy values, wherein averaging the plurality of proxy values comprises performing a rolling average on the plurality of proxy values;
  comparing, by the processing circuit, a second proxy value measured via the proxy sensor and the proxy baseline; and
  controlling, by the processing circuit, one or more pieces of building equipment to control the environmental condition of the building space based on a comparison of the second proxy value and the proxy baseline.

16. The method of claim 15, wherein the proxy sensor is a gas sensor configured to measure a concentration level of an occupant generated gas in the building space, the occupant generated gas generated by the occupant;
  wherein the concentration level of the occupant generated gas is at least one of a carbon dioxide (CO2) concentration level, a volatile organic compound (VOC) concentration level, and a nitrogen dioxide (NO2) concentration level.

17. A system for controlling an environmental condition of a building space, the system comprising:
  a proxy sensor configured to measure a proxy value indicating whether an occupant is within the building space, wherein the proxy sensor is a gas sensor configured to measure a concentration level of an occupant generated gas in the building space, the occupant generated gas generated by the occupant, wherein the concentration level of the occupant generated gas is at least one of a volatile organic compound (VOC) concentration level, an oxygen (O) concentration level, and a nitrogen dioxide (NO2) concentration level;

an occupancy sensor configured to measure an occupancy value indicating whether the occupant is within the building space, wherein the occupancy sensor is different than the proxy sensor; and a processing circuit configured to:
 determine whether the occupant is within the building space based on the occupancy value of the occupancy sensor;
 generate a proxy baseline based on a first proxy value measured via the proxy, the proxy baseline,
  collect a plurality of proxy values measured via the proxy sensor, wherein the plurality of proxy values include the first proxy value; and
  average the plurality of proxy values, wherein averaging the plurality of proxy values comprises performing a rolling average on the plurality of proxy values;
 compare a second proxy value measured via the proxy sensor and the proxy baseline; and
 control one or more pieces of building equipment to control the environmental condition of the building space based on a comparison of the second proxy value and the proxy baseline.

18. The system of claim 17, wherein the processing circuit is configured to determine whether the occupant is within the building space based on the second proxy value measured via the proxy sensor and the proxy baseline by:
 determining that the occupant is within the building space in response to at least one of:
  determining that the occupant is within the building space based on the second proxy value and the proxy baseline; and
  determining that the occupant is within the building space based on the occupancy value of the occupancy sensor; and
 determining that the occupant is not within the building space in response to:
  determining that the occupant is not within the building based on the second proxy value measured via the proxy sensor and the proxy baseline; and
  determining that the occupant is not within the building space based on the occupancy value of the occupancy sensor.

* * * * *